US012712275B2

(12) United States Patent
Liang et al.

(10) Patent No.: US 12,712,275 B2
(45) Date of Patent: Aug. 18, 2026

(54) ANTENNA ARRAY AND GROUND STATION

(71) Applicant: Chiun Mai Communication Systems, Inc., New Taipei (TW)

(72) Inventors: Chia-Ming Liang, New Taipei (TW); Chang-Ching Huang, New Taipei (TW); Chia-Hung Su, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 24 days.

(21) Appl. No.: 18/915,539

(22) Filed: Oct. 15, 2024

(65) Prior Publication Data

US 2025/0141111 A1 May 1, 2025

(30) Foreign Application Priority Data

Oct. 31, 2023 (CN) ........................ 202311440661.1

(51) Int. Cl.
*H01Q 9/04* (2006.01)
*H01Q 1/28* (2006.01)
*H01Q 1/48* (2006.01)

(52) U.S. Cl.
CPC ........... *H01Q 9/0457* (2013.01); *H01Q 1/288* (2013.01); *H01Q 1/48* (2013.01); *H01Q 9/0414* (2013.01)

(58) Field of Classification Search
CPC ........ H01Q 1/288; H01Q 1/48; H01Q 21/065; H01Q 21/24; H01Q 9/0414; H01Q 9/0435; H01Q 9/0457
See application file for complete search history.

(56) References Cited

U.S. PATENT DOCUMENTS

| | | | | |
|---|---|---|---|---|
| 9,755,306 | B1 | 9/2017 | Ogilvie | |
| 10,566,702 | B2 | 2/2020 | Oshiba et al. | |
| 2016/0197406 | A1 | 7/2016 | Hashimoto et al. | |
| 2019/0356058 | A1* | 11/2019 | Martin | H01Q 15/006 |
| 2020/0153113 | A1* | 5/2020 | Rogers | H01Q 21/0075 |
| 2021/0135368 | A1* | 5/2021 | Rogers | H01Q 9/0457 |
| 2021/0151899 | A1* | 5/2021 | Park | H01Q 5/385 |

(Continued)

FOREIGN PATENT DOCUMENTS

| | | | |
|---|---|---|---|
| CN | 103022731 | A | 4/2013 |
| CN | 113506990 | A | 10/2021 |

(Continued)

*Primary Examiner* — Thien M Le
(74) *Attorney, Agent, or Firm* — ScienBiziP, P.C.

(57) ABSTRACT

An antenna array and a ground station are provided, the antenna array includes at least one radiation module and a feed module, the radiation module includes a radiation layer and a dielectric layer arranged in stack, the radiation layer includes a plurality of radiators, each radiator radiates signals, the dielectric layer is made of non-conductive material; the feed module is arranged on a side of the radiation module closes to the dielectric layer, including a first feed layer and a second feed layer arranged in a stack, the first feed layer is provided with a plurality of first feed lines, the second feed layer is provided with a plurality of second feed lines, the first feed lines and the second feed lines are arranged in one-to-one correspondence, forming a plurality of feed line units, the feed line units are corresponding to the radiators one-to-one for providing feed signals for the corresponding radiators.

20 Claims, 15 Drawing Sheets

(56) References Cited

U.S. PATENT DOCUMENTS

| | | | | |
|---|---|---|---|---|
| 2021/0313703 | A1* | 10/2021 | Stanley | H01Q 21/0006 |
| 2022/0158363 | A1* | 5/2022 | Achour | H04B 7/04013 |
| 2022/0231431 | A1* | 7/2022 | Park | H01Q 21/28 |
| 2023/0361466 | A1* | 11/2023 | Tang | H01Q 3/36 |
| 2024/0347908 | A1* | 10/2024 | Liu | H01Q 3/36 |
| 2024/0396226 | A1* | 11/2024 | Hasegawa | H01Q 9/0457 |
| 2025/0007146 | A1* | 1/2025 | Suh | H01Q 21/065 |

FOREIGN PATENT DOCUMENTS

| | | | |
|---|---|---|---|
| TW | 202339351 | A | 10/2023 |
| WO | 2019064683 | A1 | 4/2019 |

* cited by examiner

11a

ANTENNA ARRAY AND GROUND STATION

CROSS-REFERENCE TO RELATED APPLICATIONS

This application claims priority to Chinese Patent Application No. 202311440661.1 filed on Oct. 31, 2023, in China National Intellectual Property Administration, the contents of which are incorporated by reference herein.

FIELD

The subject matter herein generally relates to antenna technology field, and more particularly to an antenna array and a ground station.

BACKGROUND

Low-orbit satellite system (LEO) is a large satellite system composed of multiple satellites that can process real-time information. In the related technologies of low-orbit satellite systems, the antenna gain used to realize communication between ground stations and low-orbit satellites is low and cannot well meet user needs, which greatly limits the communication ability of satellites to communicate with ground stations or other satellites.

BRIEF DESCRIPTION OF THE DRAWINGS

Implementations of the present disclosure will now be described, by way of embodiments, with reference to the attached figures.

DETAILED DESCRIPTION

Figure 1:
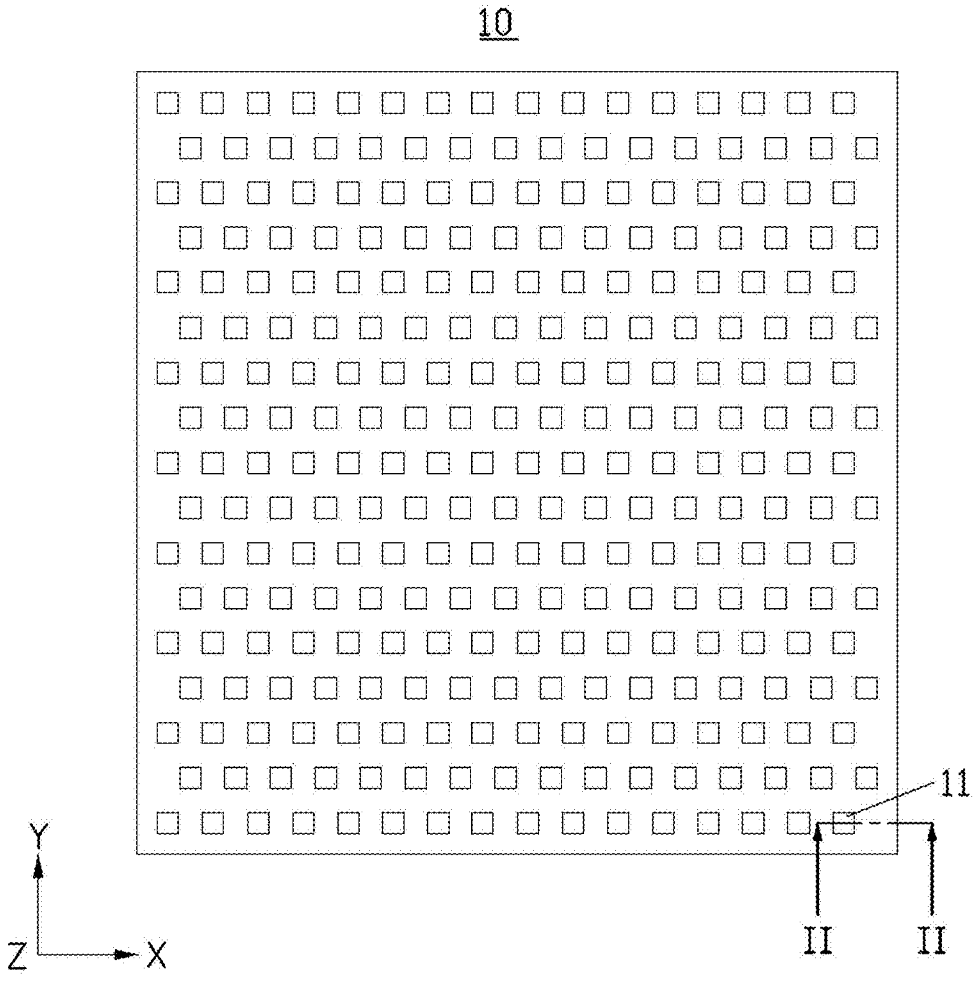
FIG. 1 is a top view diagram of an antenna array according to an embodiment of the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Low-orbit satellite system (LEO) is a large satellite system composed of multiple satellites that can process real-time information. In the related technologies of low-orbit satellite systems, the antenna gain used to realize communication between ground stations and low-orbit satellites is low and cannot well meet user needs, which greatly limits the communication ability of satellites to communicate with ground stations or other satellites.

Based on this, this application provides an antenna array that can be applied to ground stations to achieve communication among low-orbit satellites, and the antenna array has high antenna gain.

Embodiment I

Referring to FIG. 1, FIG. 1 illustrates an overall schematic diagram of an antenna array 10 provided by the present application. The antenna array 10 includes at least one radiation module and a feed module arranged in a stack. The radiation module is used to transmit or receive signals, the feed module is used to provide feed power to the radiation module. It can be understood that the at least one radiation module and the feed module form the antenna array 10 including a plurality of radiation units 11. In the following embodiments, a structural schematic diagram of a radiation unit 11 in the antenna array 10 is used as an example to illustrate the specific structure of the antenna array 10.

Figure 2:
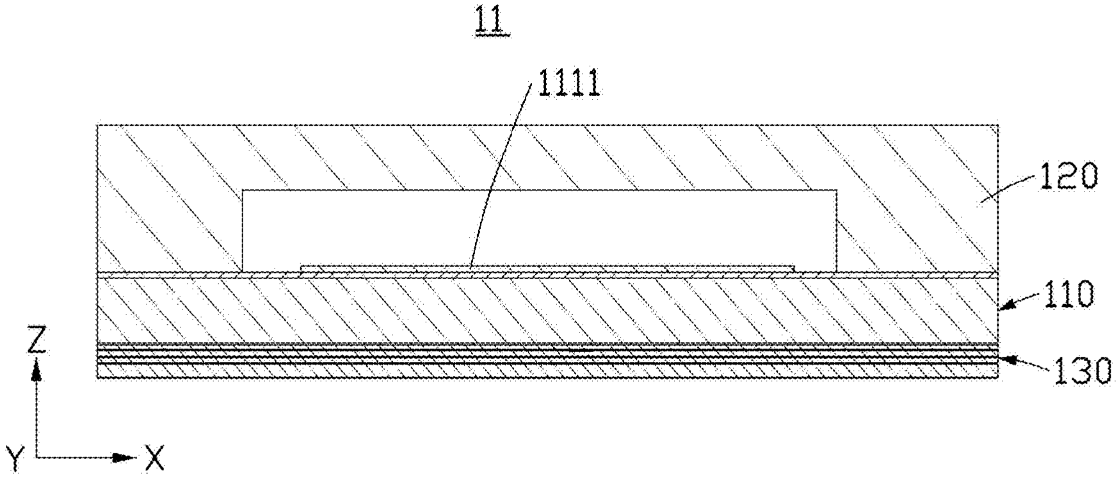
FIG. 2 is a cross-sectional view diagram of a radiation unit of the antenna array obtained along a section line II-II of FIG. 1.
Figure 3:
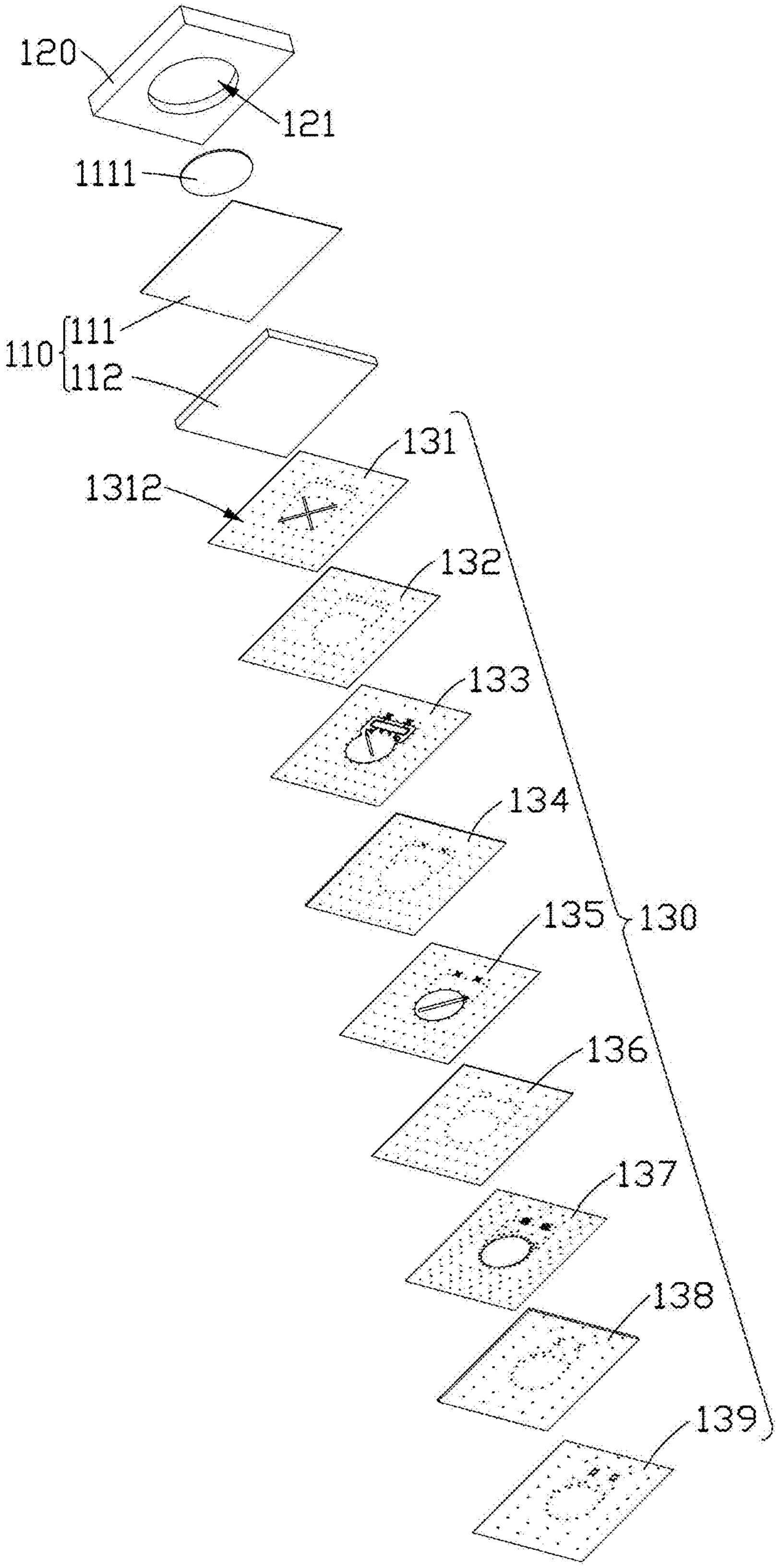
FIG. 3 is an exploded diagram of the radiation unit of FIG. 2.

Referring to FIG. 2, FIG. 2 illustrates a cross-sectional view diagram of one of the plurality of radiation units 11 of the antenna array 10. In the antenna array 10 of the present embodiment, the at least one radiation module includes a first radiation module 110. Referring to FIG. 3, the first radiation module 110 includes a first radiation layer 111 and a first dielectric layer 112 arranged in stack. The first radiation layer 111 includes a plurality of first radiators 1111, each of the plurality of first radiators 1111 is configured to radiate signals. In some embodiment, the first radiation layer 111 may be a printed circuit board, or a board made of ceramic material or plastic material board, or the like. The first radiator 1111 may be a metal coating formed on the first radiation layer 111 or other sheets made of conductive materials. The first radiator 1111 is formed on a surface of the first radiation layer 111 away from the first dielectric layer 112. The first dielectric layer 112 is made of non-conductive material. For instance, in some embodiments, the first dielectric layer 112 may be made of a material with a dielectric material coefficient of about 2.4. Specifically, the first dielectric layer 112 may be made of a ceramic material or a plastic material. Specifically, in some embodiments, the first radiator 1111 is a substantially circular copper sheet. The first radiation layer 111 and the first dielectric layer 112 are both substantially square. An area of each of the first radiating layer 111 and the first dielectric layer 112 is greater than an area of the first radiator 1111.

Figure 4:
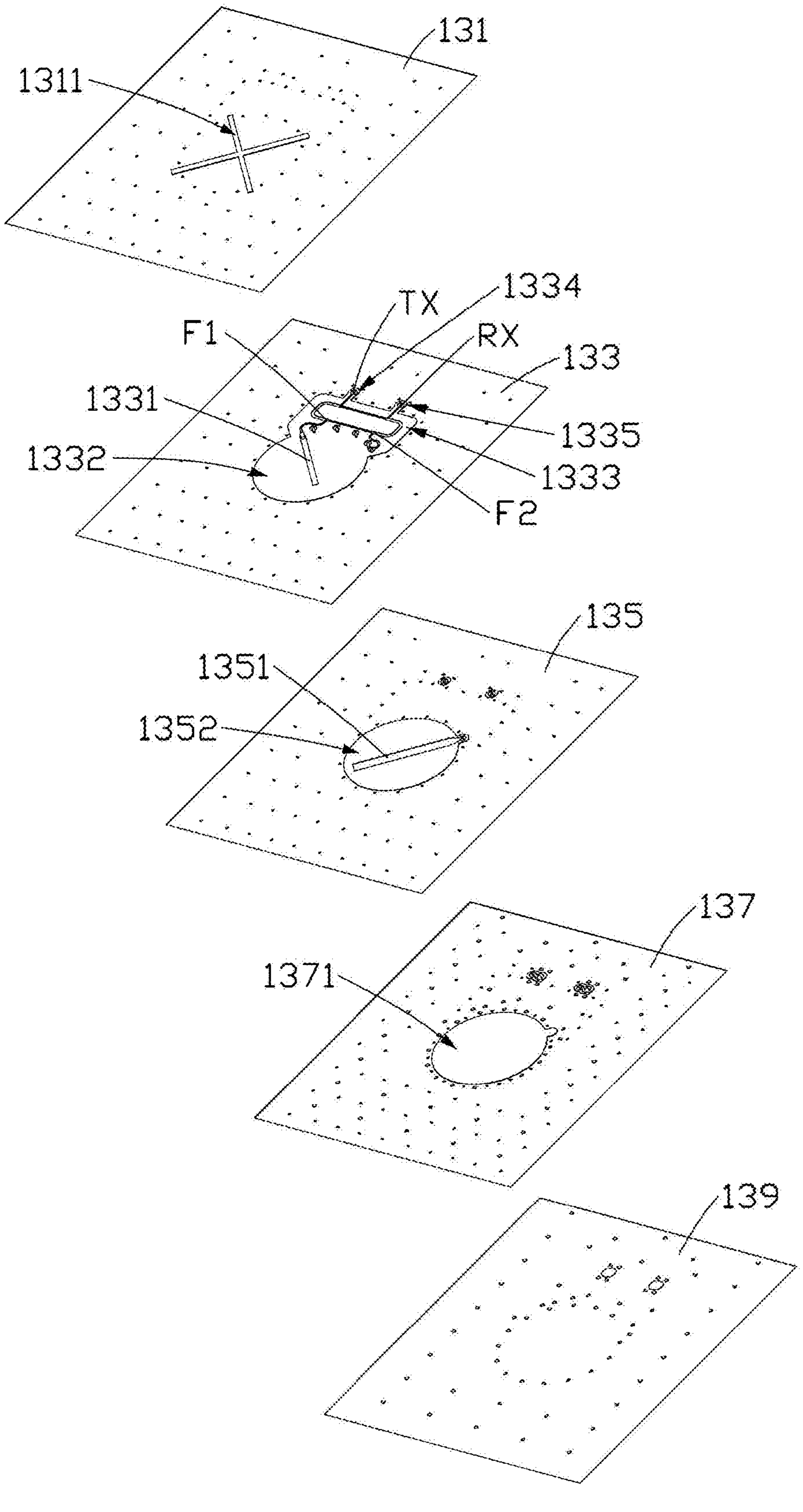
FIG. 4 is a structural diagram of a feed module of the radiation unit of FIG. 1.

Referring to FIGS. 3 and 4, the antenna array 10 further includes a feed module 130. The feed module 130 is arranged on a side of the first radiation module 110 closes to the first dielectric layer 112. The feed module 130 includes a first feed layer 133 and a second feed layer 135 arranged in a stack. The first feed layer 133 is provided with a plurality of first feed lines 1331. The second feed layer 135 is provided with a plurality of second feed lines 1351. The first feed lines 1331 and the second feed lines 1351 are arranged in one-to-one correspondence, forming a plurality of feed line units. The feed line units correspond to the first radiators 1111 on the first radiation layers 111 one-to-one, the feed line units are used to feed the corresponding first radiators 1111. In an embodiment of the present application, the one-to-one correspondence arrangement means that in a projection along the Z-axis direction of the antenna array, the projected areas of the two structures arranged in one-to-one correspondence at least partially overlap. Thus, the first feed lines 1331 and the second feed lines 1351 are arranged in one-to-one correspondence. That is to say, in the projection along the Z-axis direction of the antenna array 10, a projected area of the first feed lines 1331 and a projected areas of the second feed lines 1351 at least partially overlap each other. For instance, in the projection along the Z-axis direction of the antenna array 10, the projected area of the first feed lines 1331 completely overlaps the projected area of the second feed lines 1351, or the projected area of the first feed lines 1331 and the projected area of the second feed lines 1351 partially overlap each other. In an embodiment of the present application, the projected area of the first feed lines 1331 and the projected area of the second feed lines 1351 partially overlap each other, but do not completely overlap, so as to generate polarized waves in two different directions, especially horizontally polarized waves and vertically polarized waves.

Further, in some embodiments, the feed module 130 further includes a coupling layer 131, a first dielectric body 132, a second dielectric body 134, a third dielectric body 136, a cavity layer 137, a fourth dielectric body 138, and a ground layer 139.

Specifically, the coupling layer 131 is arranged close to the first dielectric layer 112 of the first radiation module 110, specifically arranged on a side of the first dielectric layer 112 away from the first radiation layer 111. The coupling layer 131 is used to couple a current signal flowing through the feed line unit to the first radiation module 110. In some embodiments, the coupling layer 131 is provided with a plurality of coupling slots 1311 (see FIG. 4). Each coupling slot 1311 is arranged in one-to-one correspondence with the feed line unit. In this embodiment, a shape of the coupling slot 1311 and a projection shape of the feed line unit in the Z-axis direction of the antenna array 10 may be the same or different, but they need to be long and narrow to facilitate the coupling effect, such as an elliptical shape. Thus, the coupling layer 131 couples the current signal flowing through the feed line unit to the first radiation module 110 through the coupling slots 1311. In other embodiments, the coupling layer 131 can also be replaced by a first coupling layer and a second coupling layer (not shown in the figures), and the first coupling layer is provided with a first coupling slot corresponding to the first feed line 1331, the second coupling layer is provided with a second coupling slot corresponding to the second feed line 1351. Thus, the current signal flowing through the feed line unit can also be coupled to the first radiation module 110 through the design of the first coupling layer and the second coupling layer.

The first dielectric body 132 (see FIG. 3) is arranged on a side of the coupling layer 131 away from the first dielectric layer 112.

The first feed layer 133 is arranged on a side of the first dielectric body 132 away from the coupling layer 131. The first feed layer 133 has a plurality of first receiving grooves 1332 (see FIG. 4), and the first receiving grooves 1332 penetrate the first feed layer 133. Each first feed line 1331 is respectively arranged in the corresponding first receiving groove 1332.

Further, in some embodiments, the feed module 130 further includes a plurality of phase couplers 1333. The phase couplers 1333 are used to realize signal transmission between the antenna array 10 and signal transceivers (see FIG. 26, including a transmitter 150 and a receiver 160). The phase couplers 1333 may be arranged on the first feed layer 133 or the second feed layer 135. In this embodiment, the phase couplers 1333 are arranged in the first receiving groove 1332 of the first feed layer 133. Specifically, the first feed line 1331 is a generally elongated microstrip line. The phase coupler 1333 is substantial a square ring-shaped metal ring. The first receiving groove 1332 includes a square groove and a circular groove that communicate with each other. The phase coupler 1333 is arranged in the square groove of the first receiving groove 1332, and the first feed line 1331 is arranged in the circular groove of the first receiving groove 1332. The phase coupler 1333 includes a signal receiving end RX, a signal transmitting end TX, a first signal feeding terminal F1, and a second signal feeding terminal F2. The signal receiving end RX and the signal transmitting end TX are arranged on one side of the phase coupler 1333, the first signal feeding terminal F1 and the second signal feeding terminal F2 are arranged on the other side of the phase coupler 1333 away from the signal receiving end RX and the signal transmitting end TX. Each phase coupler 1333 is used to connect to the corresponding first feed line 1331 and the second feed line 1351, to output the first feed signal to the first feed line 1331, and to output the second feed signal to the second feed line 1351. Phases of the first feed signal and the second feed signal may be the same or different. For instance, in this embodiment, the phases of the first feed signal and the second feed signal may differ by 90° or −90°. In this way, circularly polarized waves can be excited in the radiation unit 11. The signal receiving end RX is used to connect to the receiver 160 in the signal transceiver, the signal transmitting end TX is used to connect to the transmitter 150 in the signal transceiver.

The second dielectric body 134 is arranged on a side of the first feed layer 133 away from the first dielectric body 132.

The second feed layer 135 is arranged on a side of the second dielectric body 134 away from the first feed layer 133. The second feed layer 135 is provided with a plurality of second receiving grooves 1352, the second receiving grooves 1352 penetrate the second feed layer 135. The second receiving groove 1352 is arranged corresponding to the first receiving groove 1332. Each second feed line 1351 is respectively arranged in the corresponding second receiving groove 1352. Thus, each first feed line 1331 and the corresponding second feed line 1351 are arranged corresponding to each other to form the feed line unit. In this embodiment, the second feed line 1351 is also a substantially elongated strip-shaped microstrip line. The second receiving groove 1352 is substantially circular. An extension direction of the first feed line 1331 in the first feed layer 133 does not completely coincide with an extension direction of the corresponding second feed line 1351 in the second feed layer 135. The first feed line 1331 is used to generate a first polarized wave, and the second feed line 1351 is used to generate a second polarized wave. For instance, in the embodiment, in the Z-axis projection direction of the antenna array 10, the first feed line 1331 and the second feed line 1351 stagger each other at an angle. In addition, when a phase difference between the first feed signal and the second feed signal is 90°, in this way, the first feed line 1331 and the second feed line 1351 can cooperatively excite dual circularly polarized signals, which is beneficial to communication with low-orbit satellites. Further, when a radiation pattern of the signal transmitted by the signal receiving end RX and a radiation pattern of the signal transmitted by the signal transmitting end TX are mutually opposite circular polarization patterns, the antenna array 10 can also be configured to use different radiating units 11 to achieve simultaneous signal reception and transmission based on dual circularly polarized waves.

The third dielectric body 136 is arranged on a side of the second feed layer 135 away from the second dielectric body 134.

The cavity layer 137 is arranged on a side of the third dielectric body 136 away from the second feed layer 135. The cavity layer 137 is provided with a plurality of through cavities 1371 (as shown in FIG. 4). The through cavities 1371 pass through the cavity layer 137, and the plurality of through cavities 1371 is arranged in one-to-one correspondence with the feed line units. A projected area of the through cavity 1371 in the projection direction along the Z axis of the antenna array 10 covers the projected area of the corresponding feed line unit (i.e., the projected area of the first feed line 1331 and the second feed line 1351).

The fourth dielectric body 138 is arranged on a side of the cavity layer 137 away from the third dielectric body 136.

The ground layer 139 is arranged on a side of the fourth dielectric body 138 away from the cavity layer 137. Understandably, the ground layer 139 may be a metal coating arranged on a printed circuit board. The metal coating can be arranged on a side of the ground layer 139 away from the fourth dielectric body 138. In the embodiment, the coupling layer 131, the first dielectric body 132, the first feed layer 133, the second dielectric body 134, the second feed layer 135, the third dielectric body 136, the cavity layer 137, the fourth dielectric body 138, and the ground layer 139 are each provided with through holes 1312 (FIG. 3 only shows the through holes 1312 on the coupling layer 131, as shown in FIG. 3, the other layers of the feed module 130 are also provided with the through holes, but not numbered), the through holes 1312 of each layer on the feed module 130 are connected in sequence, and finally connected to the metal coating on the ground layer 139 to be grounded.

Referring to FIG. 4, in the embodiment, the first feed line 1331 is connected to a first signal feed terminal F1 of the phase coupler 1333 through a metal connector. The second feed line 1351 is connected to a second signal feed terminal F2 of the phase coupler 1333 through the through hole. The first feed layer 133, the second dielectric body 134, the second feed layer 135, the third dielectric body 136, the cavity layer 137, the fourth dielectric body 138 and the ground layer 139 are all provided with a first connection hole 1334 and a second connection hole 1335 (FIG. 4 only marks the first connection hole 1334 and the second connection hole 1335 on the first feed layer 133, as shown in FIG. 4, the second dielectric body 134, the second feed layer 135, the third dielectric body 136, the cavity layer 137, the fourth dielectric body 138, and the ground layer 139 are also provided with the first connection holes 1334 and the second connection holes 1335, but they are not labeled). Thus, the signal receiving end RX and the signal transmitting end TX of the phase coupler 1333 pass through the first feed layer 133, the second dielectric body 134, and the second feed layer 135, the third dielectric body 136, the cavity layer 137, the fourth dielectric body 138 and the ground layer 139 through the first connection hole 1334 and the second connection hole 1335 respectively, so as to be connected to the transmitter 150 and the receiver 160 (see FIG. 26) in the signal transceiver. In other embodiments, the through holes 1312, the first connection hole 1334 and the second connection hole 1335 can also be replaced by feeding probes, this application does not limit the way of the antenna array 10 realizes electrical connection in the multi-layer structure.

It should be known that the antenna array 10 is also connected to the phase modulation module (not shown in the figures). The phase modulation module is used to adjust phases of the transmitting signal and the receiving signal of the antenna array 10 to achieve high-efficiency communication between the device where the antenna array 10 is applied in and the low-orbit satellite through beam forming technology. For instance, the phase modulation module may include a control unit, a combiner, an attenuator, a power amplifier, a low-noise amplifier, etc. this application is not limited to a specific circuit structure of the phase modulation module.

In the embodiment, a working principle of the antenna array 10 is roughly as follows:

When the radiation unit 11 shown in FIG. 2 is used to transmit signals, the transmitter 150 (see FIG. 26) in the signal transceiver feeds radio frequency signals to the first feed line 1331 and the second feed line 1351 through the signal transmitting end TX. After the first feed line 1331 and the second feed line 1351 receive the feed signal through the first signal feed terminal F1 and the second signal feed terminal F2 respectively, in the Z-axis projection direction of the antenna array 10, the first feed line 1331 and the second feed line 1351 stagger each other at an angle. In this way, the first feed line 1331 and the second feed line 1351 can generate a first polarized wave and a second polarized wave respectively, especially generating horizontally polarized waves and vertically polarized waves. Additionally, the signals are fed into the first feed line 1331 and the second feed line 1351 through the phase coupler 1333, since the radiation pattern of the signal transmitted by the signal receiving end RX of the phase coupler 1333 and the radiation pattern of the signal transmitted by the signal transmitting end TX are circular polarization patterns opposite to each other, so when the first feed line 1331 and the second feed line 1351 are perpendicular to each other, the current path flowing through the first feed line 1331 and the current path flowing through the second feed line 1351 are orthogonal to each other, at this time the first polarized wave generated by the first feed line 1331 and the second polarized wave generated by the second feed line 1351 are simultaneously coupled and fed to the first radiator 1111 through the coupling slots 1311 on the coupling layer 131, causing the first radiator 1111 to transmit a left-hand circularly polarized wave or a right-hand circularly polarized wave outward. In some embodiments, an operating frequency band when the antenna array 10 is used to transmit signals may be 14 GHz-14.5 GHz.

When the radiation unit 11 shown in FIG. 2 is used to receive signals, based on the reciprocity of the antenna, the first radiator 1111 can receive left-hand circularly polarized waves and right-hand circularly polarized waves from the outside world and convert them into electrical signals, the first radiator 1111 couples corresponding electrical signals to the first feed line 1331 and the second feed line 1351 through the first coupling slot 1311, and then the first feed line 1331 and the second feed line 1351 feed back the electrical signals to the receiver 160 (see FIG. 26) in the signal transceiver through the signal receiving end RX of the phase coupler 1333. In some embodiments, an operating frequency band when the antenna array 10 is used to receive signals may be 10.7 GHz-12.7 GHz.

In some embodiments, the radiation field type of the signal transmitted by the signal receiving end RX of the phase coupler 1333 and the radiation field type of the signal transmitted by the signal transmitting end TX are mutually opposite circular polarization field types. That is to say, the radiation unit 11 may transmit one of the left-hand circularly polarized wave or the right-hand circularly polarized wave when transmitting a signal, and the radiating unit 11 may transmit the other of the left-hand circularly polarized wave or the right-hand circularly polarized wave when receiving a signal. In some other embodiments, a radio frequency switch can also be set to control the radiation unit 11 to transmit the left-hand circular polarized wave or the right-hand circular polarized wave when receiving a signal, and to control the radiation unit 11 to transmit the left-hand circular polarized wave or the right-hand circularly polarized wave when transmitting a signal.

It can be understood that since the antenna array 10 includes a plurality of radiating units 11 (for example, 1024 radiating units 11), in some embodiments, the phase modulation module can control some of the radiating units 11 in the antenna array 10 to transmit signals, at the same time, other radiating units 11 in the antenna array 10 are controlled to receive signals. In this way, the antenna array 10 can simultaneously receive and transmit signals from low-orbit satellites, thereby improving communication efficiency with low-orbit satellites.

It can be understood that in each radiating unit 11 of the antenna array 10, the projected area of the first radiator 1111 in the Z-axis direction of the antenna array 10 completely covers the projected area of the coupling slot 1311 in the Z-axis direction of the antenna array 10. So that the energy of the first feed line 1331 and the second feed line 1351 can be coupled to the first radiator 1111 as much as possible.

Further, in the application, the cavity layer 137 is disposed between the second feed layer 135 and the ground layer 139 to increase the antenna height of the antenna array 10, thereby increasing the antenna gain of the antenna array 10. The first dielectric body 132, the second dielectric body 134, the third dielectric body 136, and the fourth dielectric body 138 are used to provide support, increasing the antenna height of the antenna array 10, and further increasing the antenna gain. It can be understood that the first dielectric body 132, the second dielectric body 134, the third dielectric body 136, and the fourth dielectric body 138 can also be made of materials with a dielectric material coefficient of about 2.4.

Referring to FIG. 3 again, in some embodiments, the antenna array 10 further includes a protective layer 120. The protective layer 120 is disposed on the side of the first radiation layer 111 away from the first dielectric layer 112 to protect the antenna array 10 from an influence of sunlight, rain, and dust, so as to improve the working stability of the antenna array 10. In this embodiment, the protective layer 120 is also provided with a protective cavity 121 corresponding to the first radiator 1111. For example, the protective cavity 121 may be formed by an inward recess of a side of the protective layer 120 closes to the first radiator 1111, and the protective cavity 121 may be substantially cylindrical. In this way, the weight of the antenna array 10 can be reduced.

Further, in the antenna array 10, the first radiating layer 111, the first dielectric layer 112, the second radiating layer 141, the second dielectric layer 142, the first dielectric body 132, the second dielectric body 134, the third dielectric body 136, and the fourth dielectric body 138 can also define through holes at positions that do not correspond to the first radiator 1111. In this way, the weight of the antenna array 10 can be further reduced.

It can be understood that in the antenna array 10, each adjacent two-layer structure can be connected by adhesive, this application does not limit the specific type of adhesive.

Figure 5:
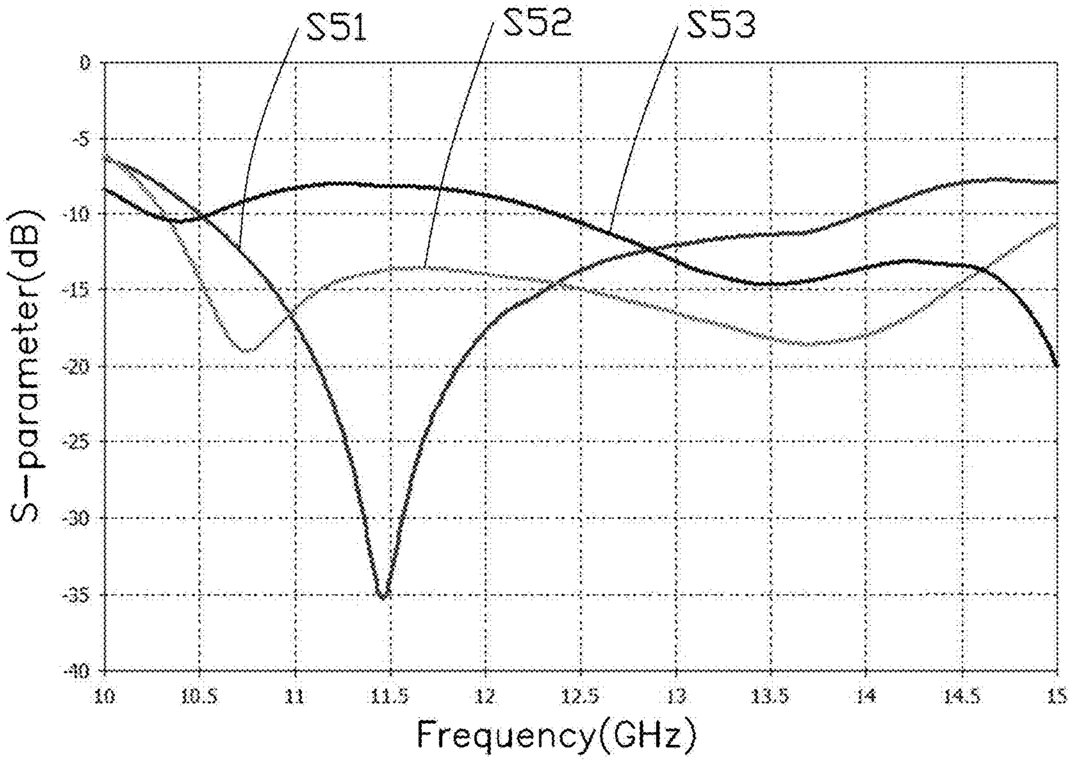
FIG. 5 is a scattering parameter (S-parameter) diagram of the radiation unit of FIG. 2.

Referring to FIG. 5, FIG. 5 is a scattering parameter (S-parameter) diagram of the radiation unit of FIG. 2. Curve S51 represents a S11 value of the signal receiving end RX when the radiation unit 11 is used to receive signals; curve S52 represents a S12 value between the signal receiving end RX and the signal transmitting end TX; curve S53 represents a S11 value of the signal transmitting end TX when the radiation unit 11 is used to transmit signals. It can be seen from FIG. 5 that the radiating unit 11 has a good reflection coefficient whether it is transmitting signals or receiving signals, and there is a good isolation between the signal receiving end RX and the signal transmitting end TX of the radiating unit 11.

In summary, the antenna array 10 provided by this application includes the first radiation module 110 and the feed module 130. The first radiation module 110 includes the first radiation layer 111 and the first dielectric layer 112 arranged in stack, and the plurality of first radiators 1111 are provided on the first radiation layer 111. In this way, the first dielectric layer 112 can concentrate the antenna beam of each first radiator 1111 to improve the antenna gain of the antenna array 10. The feed module 130 includes the first feed layer 133 and the second feed layer 135. The first feed layer 133 is provided with the first feed lines 1331, and the second feed layer 135 is provided with the second feed lines 1351, the first feed lines 1331 and the second feed lines 1351 are arranged in one-to-one correspondence to form the plurality of feed line units, and each feed line unit corresponds to the first radiator 1111 in one-to-one correspondence. In this way, the first feed lines 1331 and the second feed lines 1351 can generate different polarized waves respectively, so that the first radiators 1111 can receive and transmit signals of two different polarized states at the same time, which can improve a system capacity of the antenna array 10, reduce interference from the antenna array 10, enhance signal quality, and improve coverage of the antenna array 10.

Embodiment II

Figure 6:
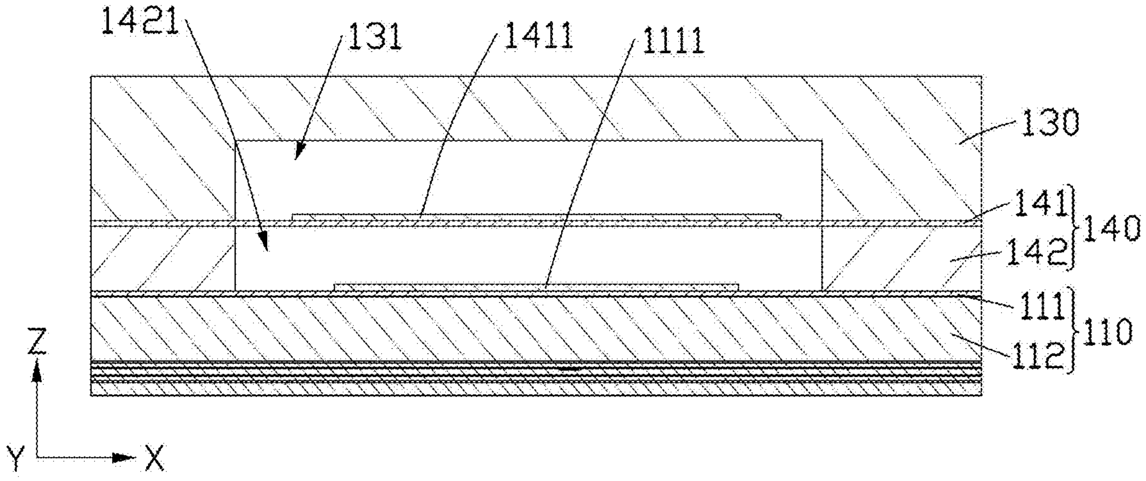
FIG. 6 is a structural diagram of the radiation unit according to another embodiment of the present application.
Figure 7:
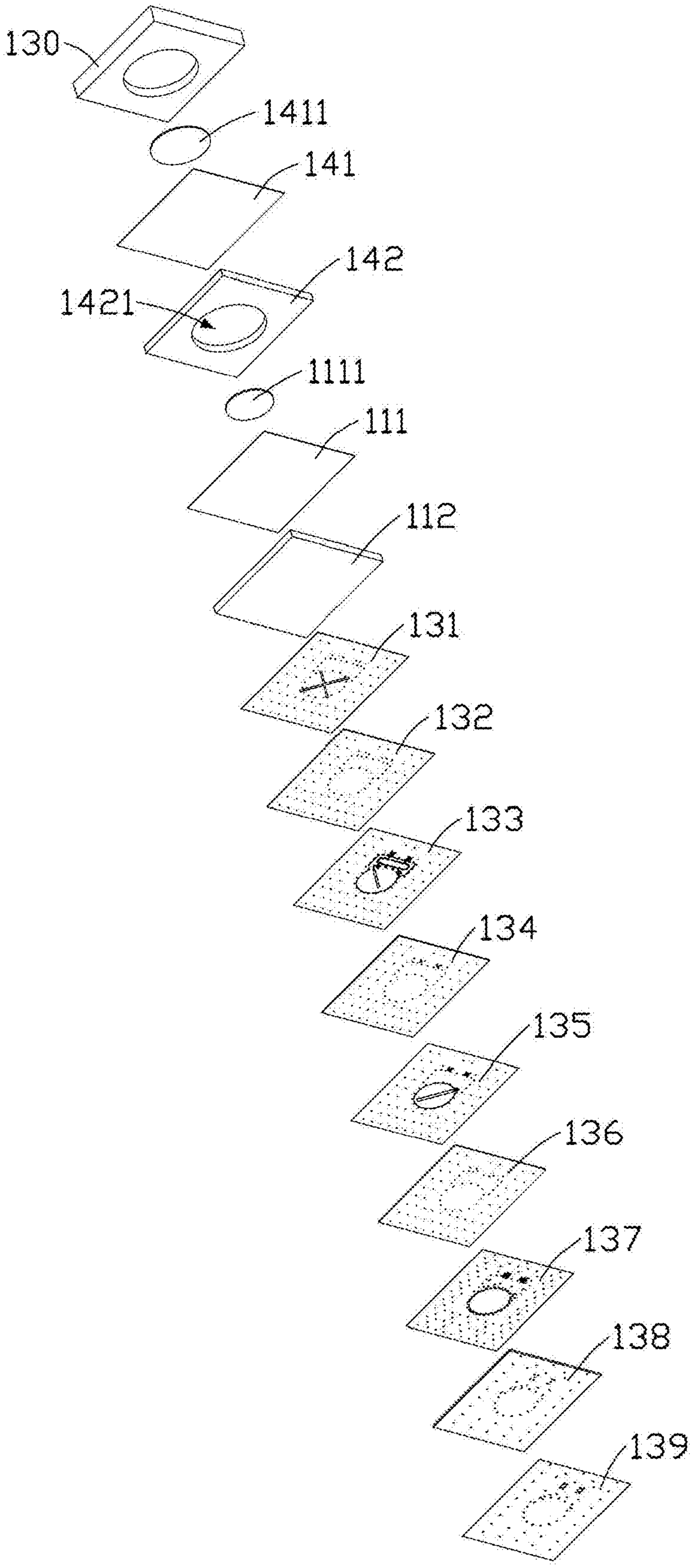
FIG. 7 is an exploded diagram of the radiation unit of FIG. 6.

Please refer to FIGS. 6 and 7, embodiment II of the present application further provides another structure of the radiation unit 11*a*. The structure of the radiation unit 11*a* provided in the embodiment II is substantially the same as the structure of the radiation unit 11 provided in the embodiment I, the difference is that at least one radiation module in the embodiment II includes two radiation modules. And the radiation layer of one of the radiation modules is disposed close to the dielectric layer of the other one of the radiation modules. The radiators of the two radiation layers are arranged in one-to-one correspondence, and the two corresponding radiators receive the feed signal provided by the same feed line unit.

For instance, the antenna array 10 further includes a second radiation module 140. The second radiation module 140 includes a second radiation layer 141 and a second dielectric layer 142 arranged in stack. The second radiation layer 141 includes a plurality of second radiators 1411. The first radiation layer 111 of the first radiation module 110 is disposed close to the second dielectric layer 142 of the second radiation module 140. And the plurality of second radiators 1411 and the plurality of first radiators 1111 are arranged in one-to-one correspondence. In this way, the first radiators 1111 and the second radiators 1411 corresponding to each other and can receive the feed signal coupled to the feed line unit corresponding to the first radiator 1111. That is to say, after the feed line unit corresponding to the first radiator 1111 couples energy to the first radiator 1111, the first radiator 1111 continues to couple energy to the second radiator 1411 to realize signal transmission or reception of the antenna array 10. In the embodiment, the first radiation layer 111 can be a printed circuit board, the second radiator 1411 can be a substantial circular metal sheet or metal coating formed on the first radiation layer 111.

Further, the second dielectric layer 142 is also provided with a plurality of cavities 1421. Each cavity 1421 penetrates the second dielectric layer 142. A diameter of the cavity 1421 may be equal to the diameter of the corresponding protection cavity 121, an edge of the cavity 1421 is aligned with an edge of the protection cavity 121. And each cavity 1421 is provided in one-to-one correspondence with the two radiators on both sides (i.e., the first radiator 1111 and the second radiator 1411). Specifically, a line formed by centers of the cavity 1421, the first radiator 1111, and the second radiator 1411 is parallel to the Z-axis. Moreover, a projected area of the second radiator 1411 in the Z-axis direction of the antenna array 10 is larger than the projected area of the first radiator 1111 in the Z-axis direction of the antenna array 10. Thus, in the embodiment, the antenna height is further increased through the first dielectric layer 112 and the second dielectric layer 142 to increase the antenna gain; the second radiator 1411 is provided to cover the first radiator 1111 so that the energy that coupled to the second radiator 1411 by the first radiator 1111 is more concentrated, thereby increasing the directivity of the energy beam of the antenna array 10.

It can be understood that the second dielectric layer 142 can also be made of plastic or ceramic materials.

Figure 8:
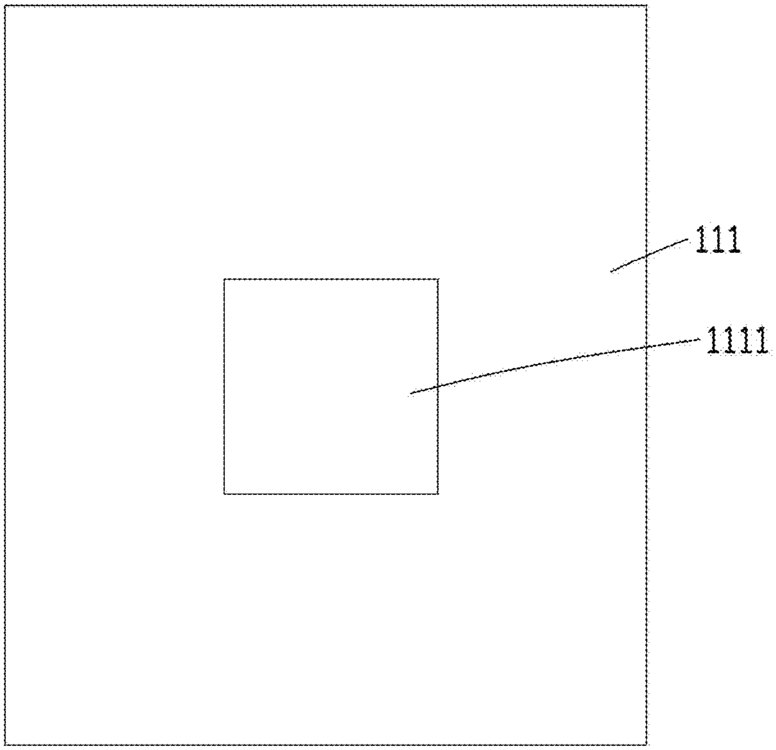
FIG. 8 is a schematic diagram of a first radiation layer according to another embodiment of the present application.

It can be understood that this application does not limit the specific shapes of the first radiator 1111 and the second radiator 1411. For example, please refer to FIG. 8, in other embodiments, the shape of the first radiator 1111 may also be a rectangle. In other embodiments, the shapes of the first radiator 1111 and the second radiator 1411 may also be other polygonal or irregular shapes, and the shapes of the first radiator 1111 and the second radiator 1411 may be the same or different. It is only necessary that the projected area of the first radiator 1111 in the Z-axis direction of the antenna array 10 can cover the projected area of the coupling slot 1311, and the projected area of the second radiator 1411 in the Z-axis direction of the antenna array 10 can cover the first radiator 1111.

It can be understood that the working principle of the antenna array 10 provided in the embodiment II is substantially the same as that of the antenna array provided in the embodiment I. The difference is that after the feed line unit couples energy to the first radiator 1111 through the coupling slot 1311 of the coupling layer 131, the first radiator 1111 continues to couple energy to the second radiator 1411 to transmit left-hand polarized waves or right-hand polarized waves through the second radiator 1411, thereby realizing communication between the antenna array 10 and the low-orbit satellite.

Figure 9:
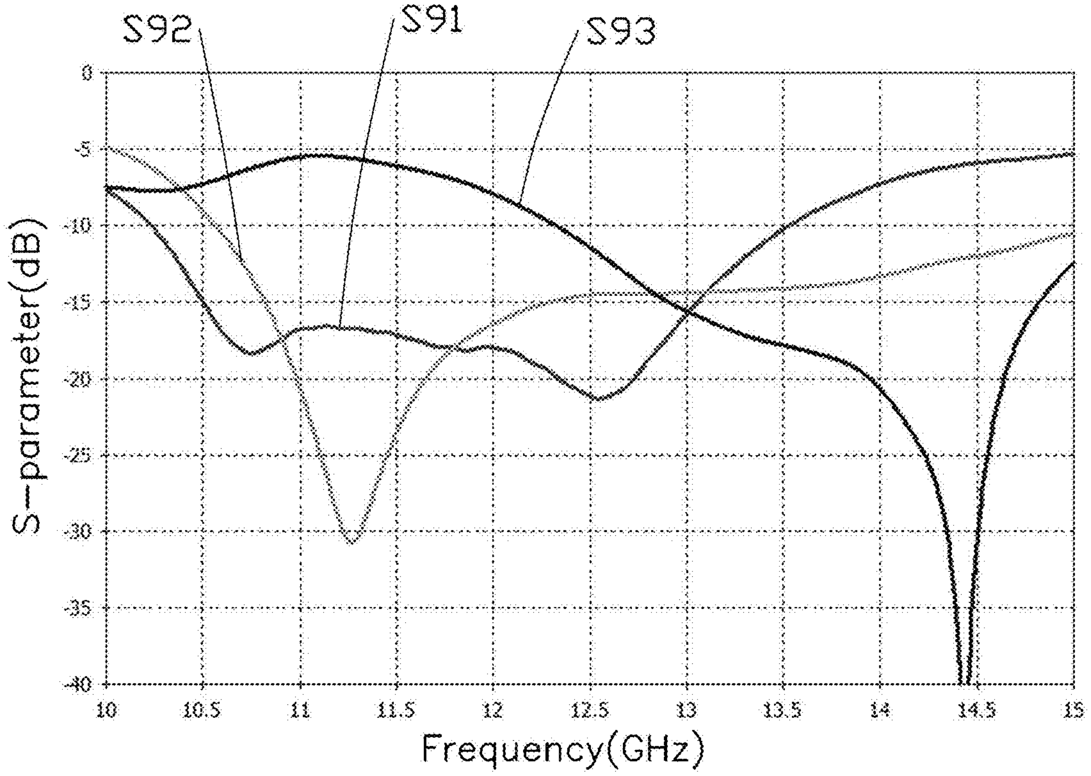
FIG. 9 is a S-parameter diagram of the radiation unit of FIG. 6.

Referring to FIG. 9, FIG. 9 is a S-parameter diagram of the radiation unit of FIG. 6. Curve S91 represents the S11 value of the signal receiving end RX when the radiating unit 11*a* is used to receive signals; curve S92 represents the S12 value between the signal receiving end RX and the signal transmitting end TX; curve S93 represents the S11 value of the signal transmitting end TX when the radiating unit 11*a* is used to transmit signals. It can be seen from FIG. 9 that the radiation unit 11*a* has a good reflection coefficient whether it is transmitting signals or receiving signals, and there is a good isolation between the signal receiving end RX and the signal transmitting end TX of the radiating unit 11*a*.

Figure 10:
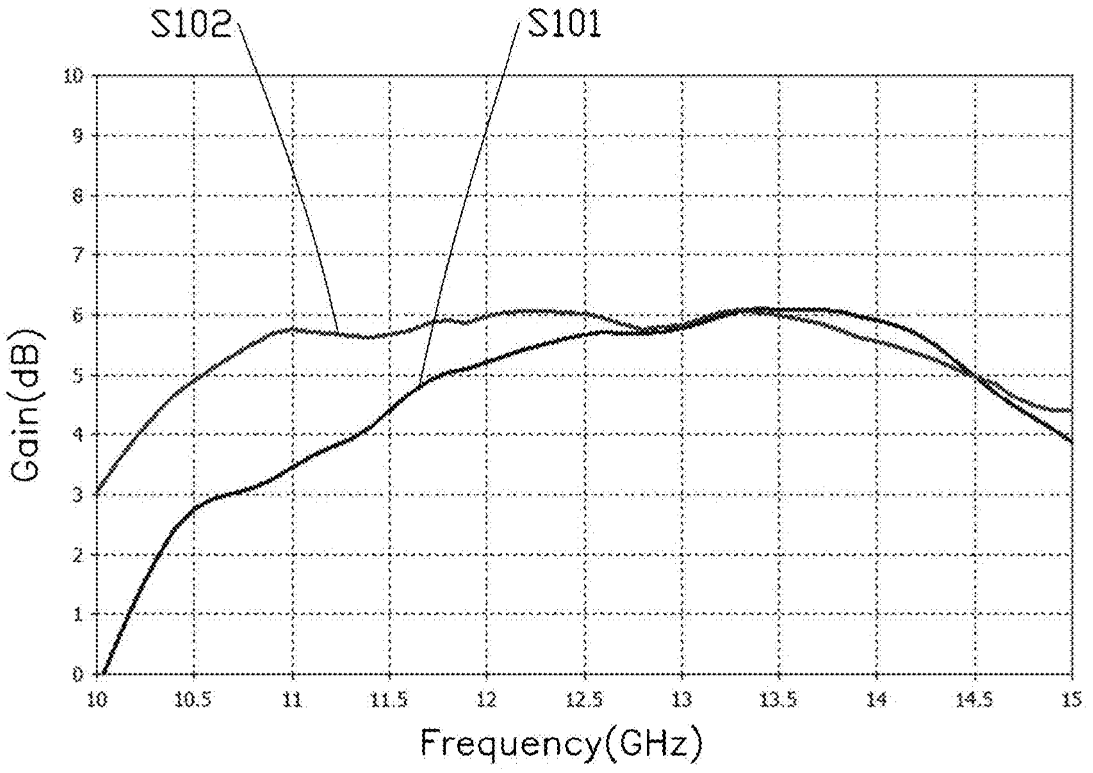
FIG. 10 is an antenna gain diagram of the radiation unit of FIG. 6.

Referring to FIG. 10, FIG. 10 is an antenna gain diagram of the radiation unit of FIG. 6. Curve S101 represents the gain value of the signal transmitting end TX when the radiating unit 11*a* is used to transmit signals; curve S102 represents the gain value of the signal receiving end RX when the radiating unit 11*a* is used to receive signals. It can be seen from FIG. 10 that the radiating unit 11*a* has a high antenna gain and meets the antenna working requirements.

Figure 11:
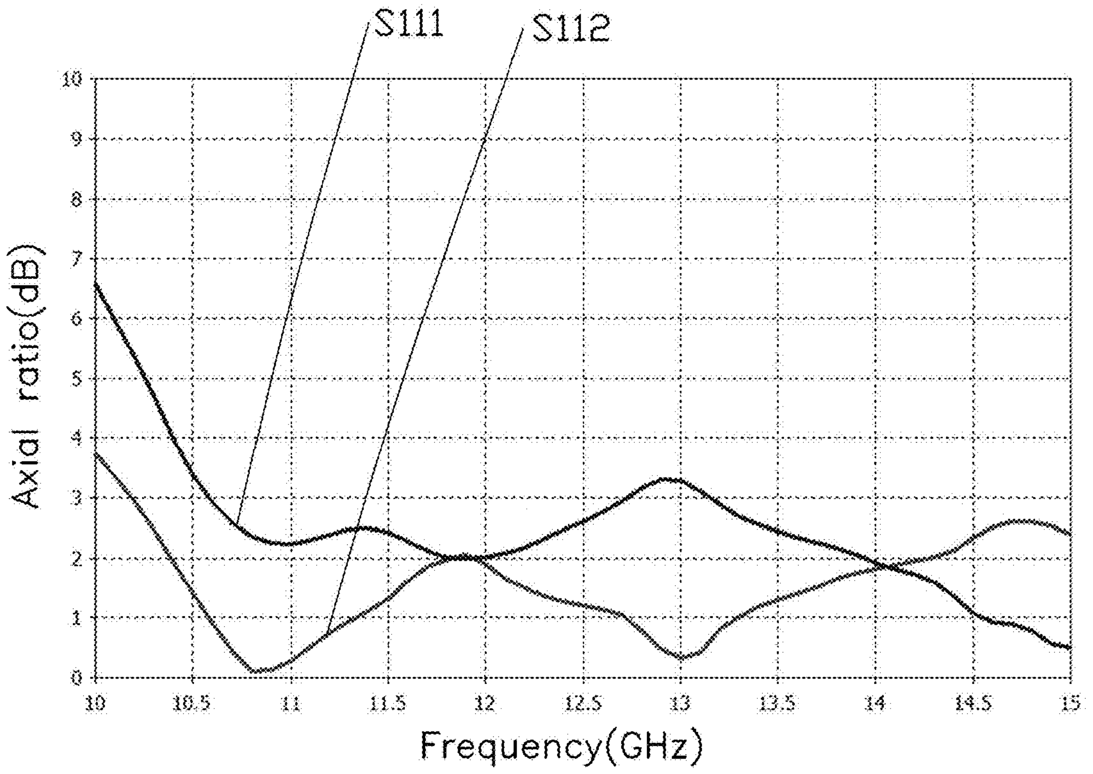
FIG. 11 is an axial ratio diagram of the radiation unit of FIG. 6.

Referring to FIG. 11, FIG. 11 is an axial ratio diagram of the radiation unit of FIG. 6. Curve S111 represents the axial ratio of the signal transmitting end TX when the radiating unit 11*a* is used to transmit signals; curve S112 represents the axial ratio of the signal receiving end RX when the radiating unit 11*a* is used to receive signals. According to FIG. 11, it can be seen that the axial ratio of the signal transmitting end TX at 14 GHz-14.5 GHz is less than 2, and the axial ratio of the signal receiving end RX at 10.7 GHz-12.5 GHz is less than 1, the dual circularly polarized waves generated by the radiation unit 11*a* have high circular polarization purity and are suitable for application in the field of satellite communications.

Figure 12:
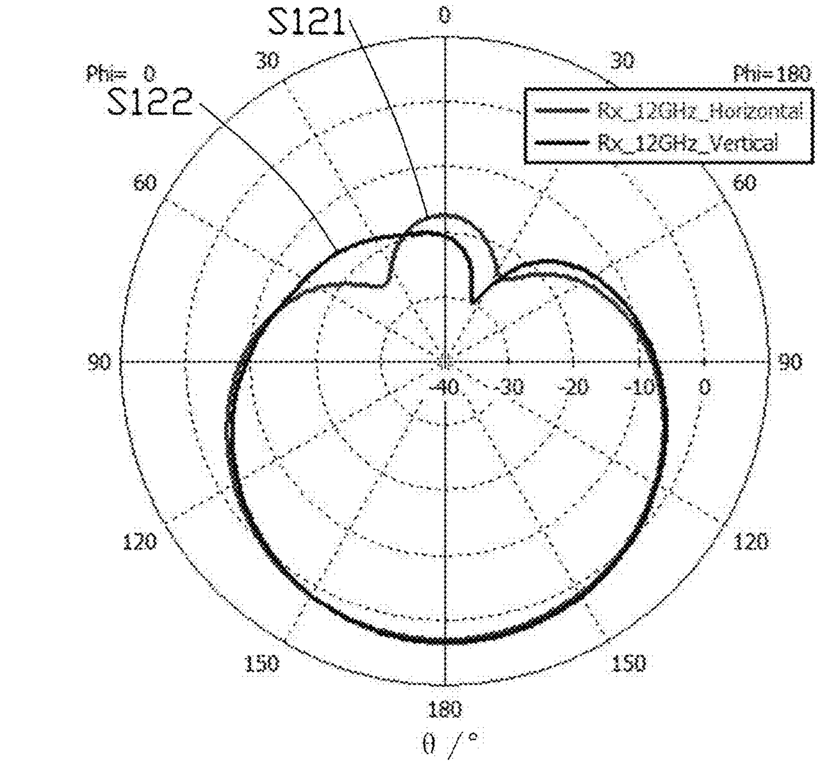
FIG. 12 is a radiation field pattern diagram measured by a signal receiving end of the radiation unit shown in FIG. 6 when the radiation frequency is 12 GHz.
Figure 13:
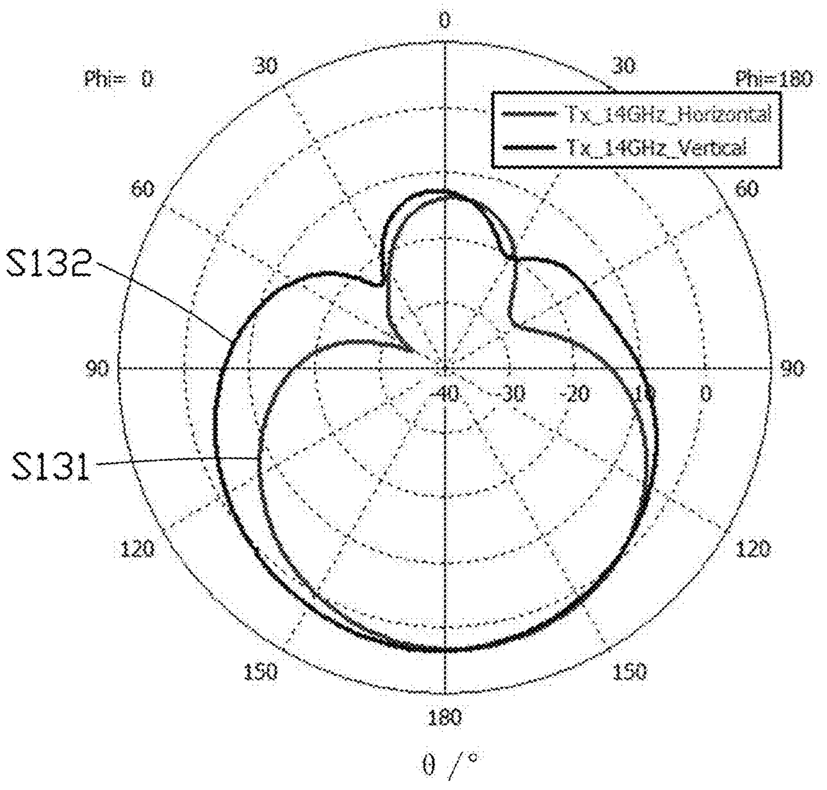
FIG. 13 is a radiation field pattern diagram measured by the signal receiving end of the radiation unit shown in FIG. 6 when the radiation frequency is 14 GHz.

Referring to FIGS. 12 and 13, FIG. 12 is a radiation field pattern diagram measured by a signal receiving end of the radiation unit shown in FIG. 6 when the radiation frequency is 12 GHz, curve S121 is the horizontal radiation field pattern measured by the signal receiving end RX when the radiation frequency is 12 GHz; curve S122 is the vertical radiation field pattern measured by the signal receiving end RX when the radiation frequency is 12 GHz. FIG. 13 is a radiation field pattern diagram measured by the signal transmitting end of the radiation unit shown in FIG. 6 when the radiation frequency is 14 GHz, curve S131 is the horizontal radiation field pattern measured by the signal transmitting end TX when the radiation frequency is 14 GHz; curve S132 is the vertical radiation field pattern measured by the signal transmitting end TX when the radiation frequency is 14 GHz. It can be seen from FIGS. 12 and 13 that the radiating unit 11*a* has great radiation coverage and antenna gain, which meets the antenna working requirements.

Embodiment III

Embodiment III continues to provide another radiation unit. The structure of the radiation unit provided in embodiment III is substantially the same as the structure of the radiation unit provided in embodiment II. The difference is that the feed module of the radiation unit in embodiment III is not provided with a phase coupler 1333 is not provided in the feed module of the radiation unit in embodiment III, the structure of the second radiation module in embodiment III is different from the structure of the second radiation module in embodiment II.

In detail, referring to FIGS. 14, 15, 16 and 17, in the radiation unit provided in embodiment III, the feed module includes a first feed layer 133*b*, a second feed layer 135*b*, a cavity layer 137*b* and a ground layer 139*b*. It can be understood that in the radiation unit provided in embodiment III, the feed module also includes the coupling layer 131, the first dielectric body 132, the second dielectric body 134, the third dielectric body 136, and the fourth dielectric body 138. The arrangement manner of the coupling layer 131, the first dielectric body 132, the second dielectric body 134, the third dielectric body 136, and the fourth dielectric body 138 is substantially the same as that shown in FIG. 7, and will not be described again here.

The first feed layer 133*b* is provided with a substantial circular first receiving groove 1332*b*. The first feed line 1331*b* is disposed in the first receiving groove 1332*b*. The second feed layer 135*b* is provided with a substantial circular second receiving groove 1352*b*. The second feed line 1351*b* is disposed in the second receiving groove 1352*b*. An extension direction of the first feed line 1331*b* in a plane where the first feed layer 133 is located does not completely coincide with an extension direction of the second feed line 1351*b* in a plane where the second feed layer 135*b* is located. In the embodiment, a shape of the first feed line 1331*b* is substantially the same as that of the first feed line 1331 in FIG. 7, and a shape of the second feed line 1351*b* is substantially the same as that of the second feed line 1351 in FIG. 7, both of which are substantially thin and long shape. In the embodiment, the extension direction of the first feed line 1331*b* in the plane where the first feed layer 133*b* is located and the extension direction of the second feed line 1351*b* in the plane where the second feed layer 135*b* is located are perpendicular to each other.

The structure and location of the cavity layer 137*b* and the ground layer 139*b* are substantially the same as those of the cavity layer 137 and the ground layer 139 shown in FIG. 7, with the difference is that the cavity layer 137*b* is respectively provided with a first connection hole 1334*b* and a second connection hole 1335*b* corresponding to the first signal feed end F1 of the first feed line 1331*b* and the second signal feed end F2 of the second feed line 1351*b*. The ground layer 139*b* is also provided with the first connection hole 1334*b* and the second connection hole 1335*b* respectively corresponding to the first signal feed end F1 of the first feed line 1331*b* and the second signal feed end F2 of the second feed line 1351*b*. It can be understood that the first connection hole 1334*b* and the second connection hole 1335*b* are also provided on the second dielectric body 134, the second feed layer 135*b*, the third dielectric body 136, and the fourth dielectric body 138 of embodiment III. Thus, the first signal feed end F1 of the first feed line 1331*b* passes through the through holes of the second dielectric body 134, the second feed layer 135*b*, the third dielectric body 136, the cavity layer 137*b*, the fourth dielectric body 138, and the ground layer 139*b* through the first connection hole 1334*b*, and is connected to one of the transmitter 150 and the receiver 160 of the signal transceiver. The second signal feed end F2 of the second feed line 1351*b* passes through the through holes of the third dielectric body 136, the cavity layer 137*b*, the fourth dielectric body 138, and the ground layer 139*b*, and is connected to the other one of the transmitter 150 and the receiver 160 of the signal transceiver.

Figure 18:
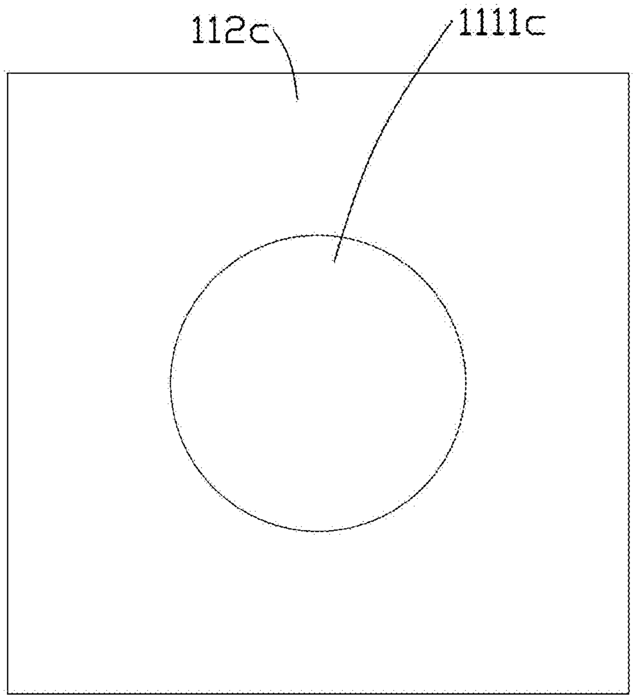
FIG. 18 is a schematic diagram of a first dielectric layer and a first radiator according to another embodiment of the present application.
Figure 19:
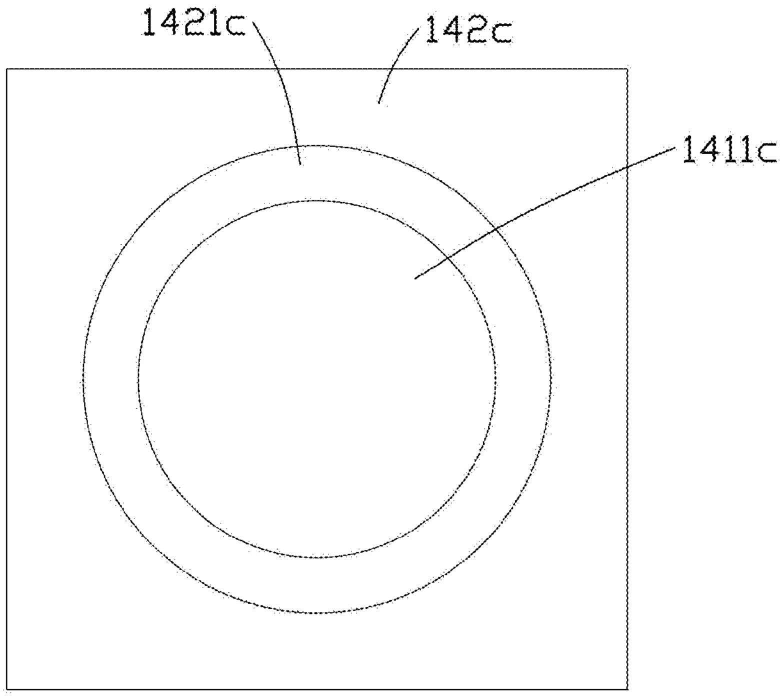
FIG. 19 is a schematic diagram of a second dielectric layer and a second radiator according to another embodiment of the present application.

Referring to FIGS. 18 and 19, the radiation unit provided by embodiment III includes two radiation modules, the structure of the two radiation modules is substantially the same as the structure of the two radiation modules (including the first radiation module 110 and the second radiation module 140) shown in FIG. 6. The difference is that the radiation unit provided in this application only includes the first dielectric layer 112*c*, the first radiator 1111*c*, the second dielectric layer 142*c*, and the second radiator 1411*c*. That is, the radiation unit provided in embodiment III is not provided with redundant printed circuit boards such as the first radiation layer 111 and the second radiation layer 141. In this embodiment, the second dielectric layer 142*c* also has a plurality of cavities 1421*c* corresponding to the second radiators 1411*c*.

In the embodiment, after receiving the feed signal, the first feed line 1331*b* and the second feed line 1351*b* are respectively used to generate the first polarized wave and the second polarized wave. And the first polarized wave and the second polarized wave are perpendicular to each other. Thus, the first polarized wave and the second polarized wave generated by the first feeding line 1331*b* and the second feeding line 1351*b* are fed into the first radiator 1111*c* through the coupling layer 131, and continue to be fed into the second radiator 1411*c* through the first radiator 1111*c*, so that the second radiator 1411*c* can excite two mutually perpendicularly polarized electromagnetic waves. Thus, the radiation unit provided in embodiment III can form a dual-polarized antenna. It can be understood that a dual-polarized antenna is an antenna that can receive and transmit signals of two different polarized states at the same time. The dual-polarized antenna are capable of transmitting two orthogonally polarized (that is, mutually perpendicular polarized) signals within the same frequency band, usually horizontal polarized and vertical polarized. In this way, the antenna array including a plurality of radiating units as provided in embodiment III can increase system capacity, reduce interference, enhance signal quality, and improve coverage.

It can be understood that the first feeding line 1331*b* can be connected to the transmitter 150, or connected to the receiver 160. The second feeding line 1351*b* can be connected to the transmitter 150, or connected to the receiver 160. All of the above connection methods can feed signals to the first feed line 1331*b* and the second feed line 1351*b*.

Figure 20:
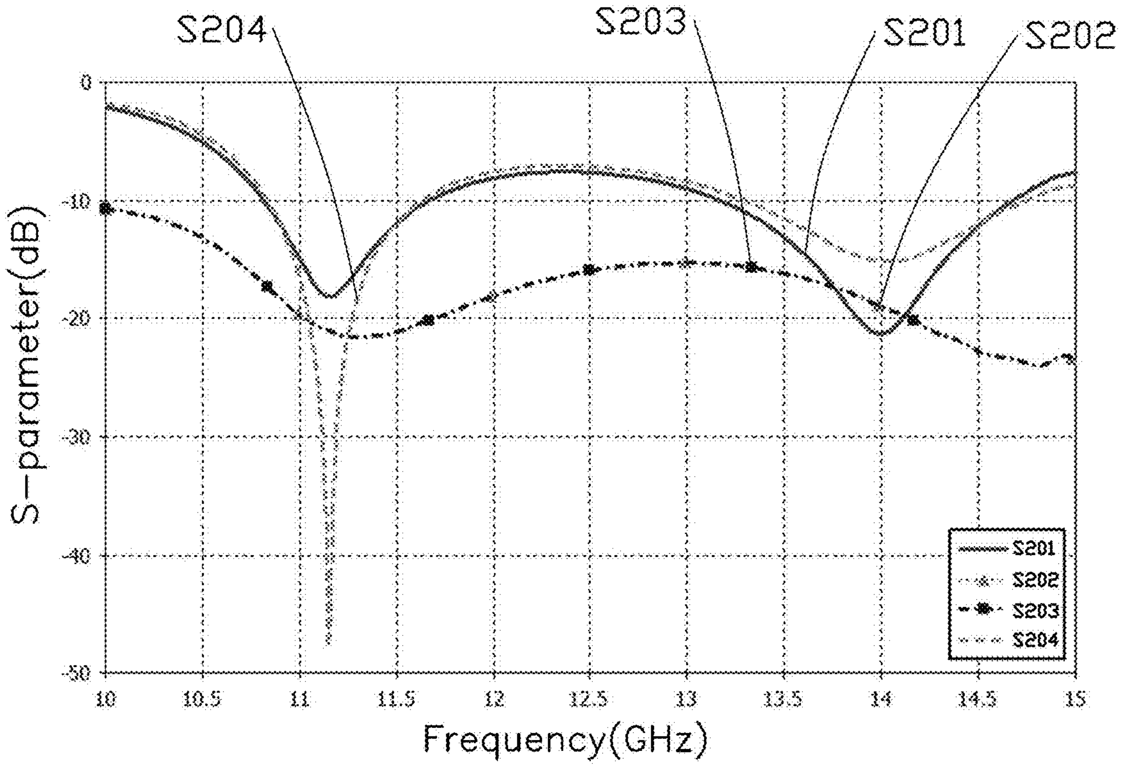
FIG. 20 is a S-parameter diagram of the radiation unit according to another embodiment of the present application.

Referring to FIG. 20, FIG. 20 is a S-parameter diagram of the radiation unit according to another embodiment of the present application. Curve S201 is the S11 value when the first feed line 1331*b* feeds a signal. Curve S202 and curve S203 are isolation curves between the first feed line 1331*b* and the second feed line 1351*b* when both the first feed line 1331*b* and the second feed line 1351*b* feed signals. Curve S204 is the S11 value when the second feed line 1351*b* feeds a signal. It can be seen from FIG. 20 that the radiation units provided in embodiment III all have good reflection coefficients, and there is good isolation between the first feed line 1331*b* and the second feed line 1351*b*.

Figure 21:
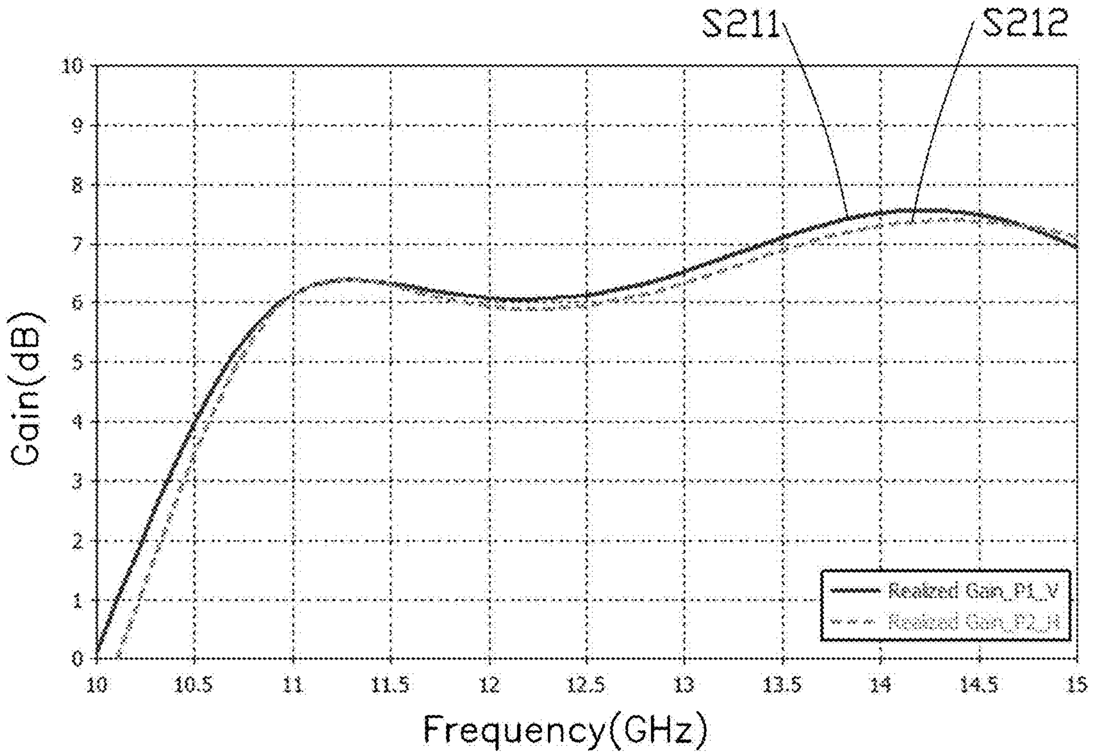
FIG. 21 is an antenna gain diagram of the radiation unit according to another embodiment of the present application.
Figure 22:
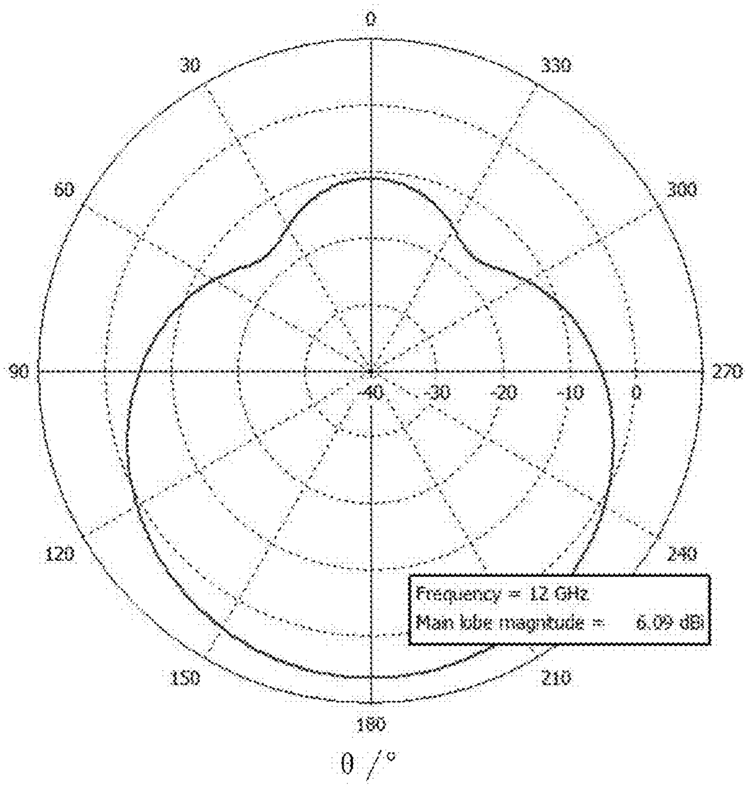
FIG. 22 is a radiation field pattern diagram when a first feed line of FIG. 14 feeds a signal and the operating frequency is 12 GHz.

Referring to FIG. 21, FIG. 21 is an antenna gain diagram of the radiation unit according to another embodiment of the present application. Curve S211 is the gain value when the first feed line 1331*b* feeds a signal; curve S212 is the gain value when the second feed line 1351*b* feeds a signal. It can be seen from FIG. 21 that the radiating unit provided by this embodiment has a high antenna gain and meets the antenna working requirements.

Figure 14:
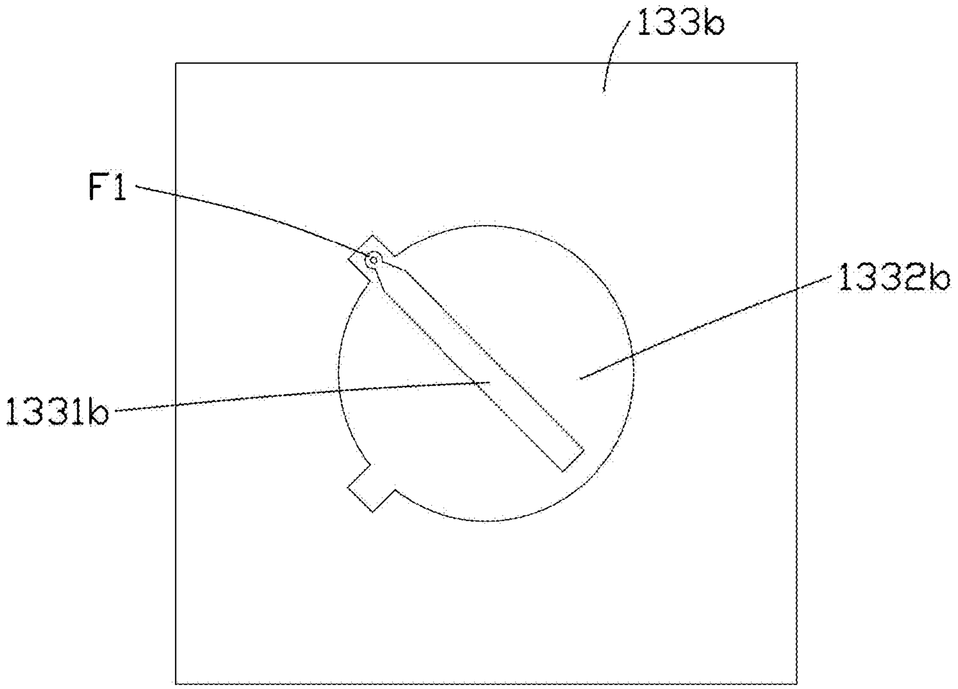
FIG. 14 is a schematic diagram of the first radiation layer according to another embodiment of the present application.
Figure 15:
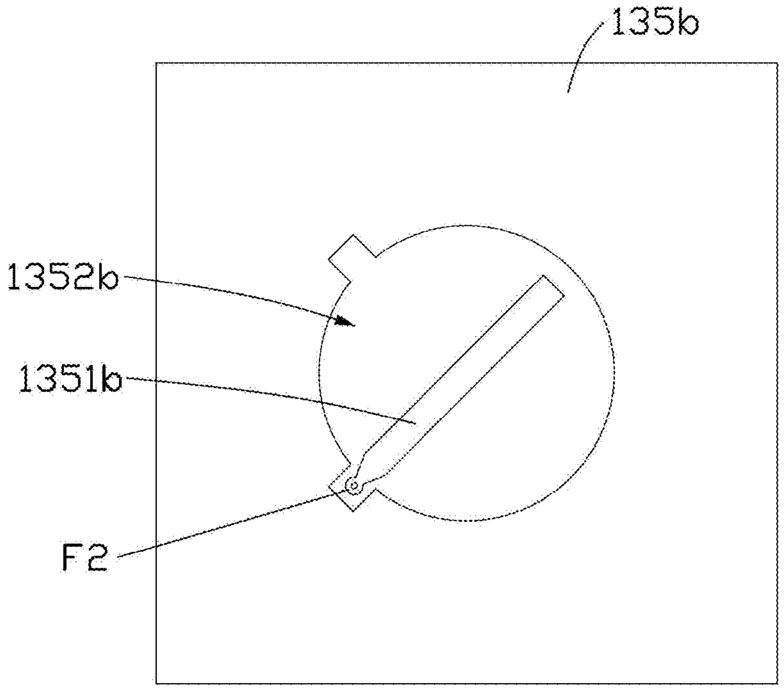
FIG. 15 is a schematic diagram of a second radiation layer according to another embodiment of the present application.
Figure 16:
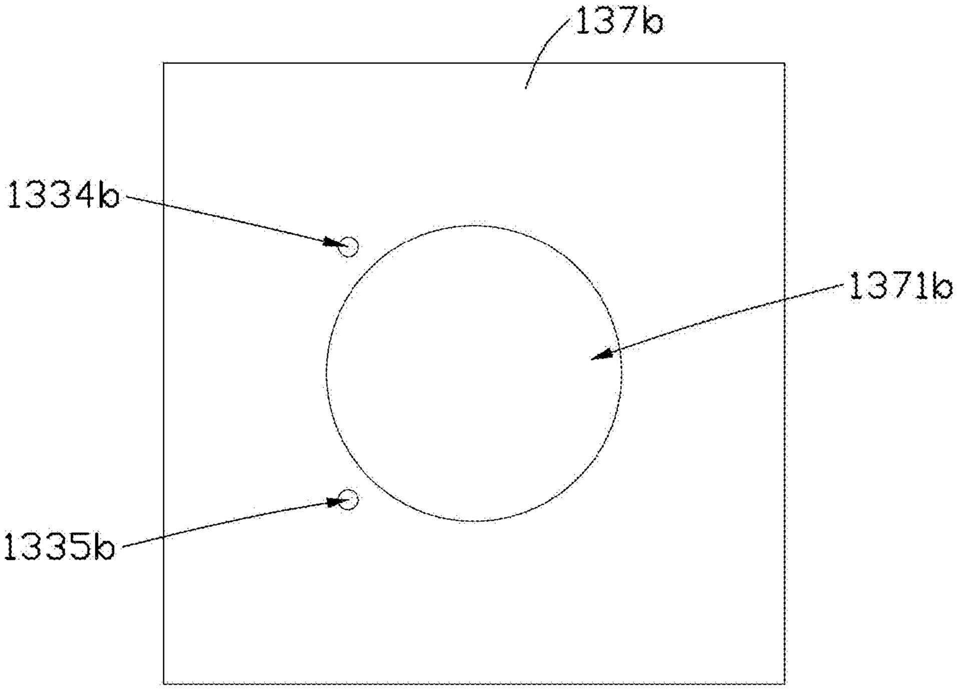
FIG. 16 is a schematic diagram of a cavity layer according to another embodiment of the present application.
Figure 17:
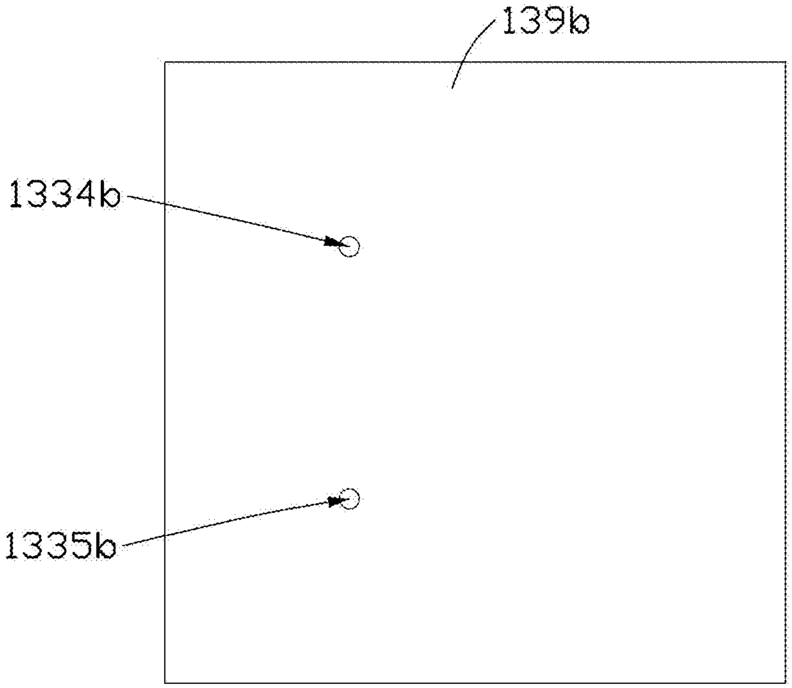
FIG. 17 is a schematic diagram of a ground layer according to another embodiment of the present application.
Figure 23:
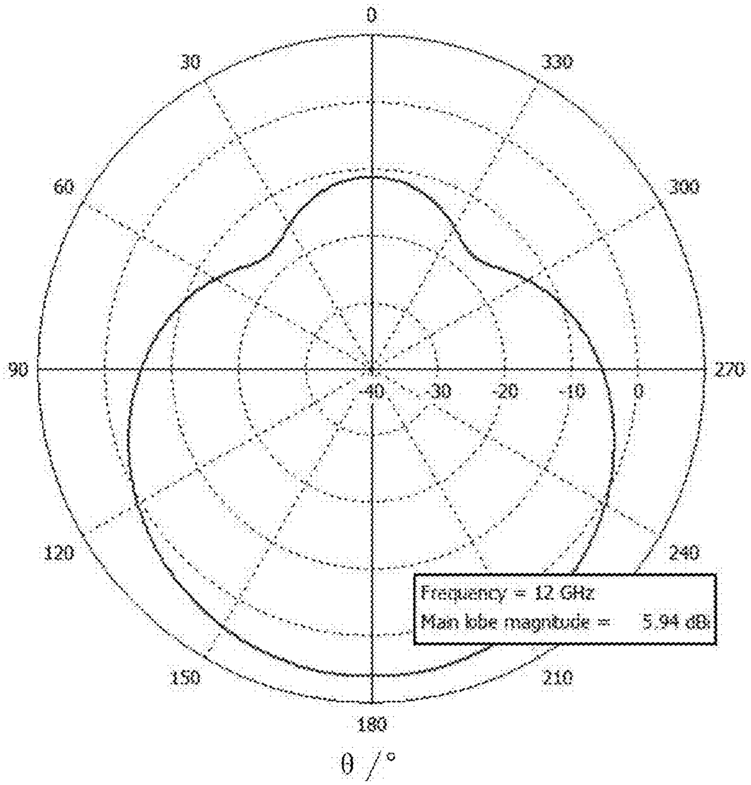
FIG. 23 is a radiation field pattern diagram when a second feed line of FIG. 15 feeds a signal and the operating frequency is 12 GHz.
Figure 24:
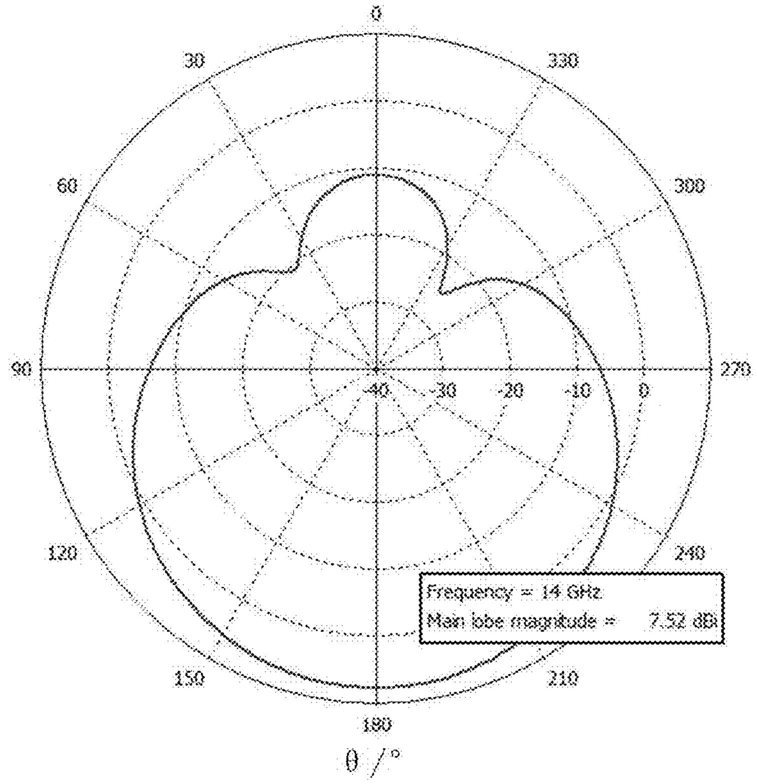
FIG. 24 is a radiation field pattern diagram when the first feed line of FIG. 14 feeds a signal and the operating frequency is 14 GHz.
Figure 25:
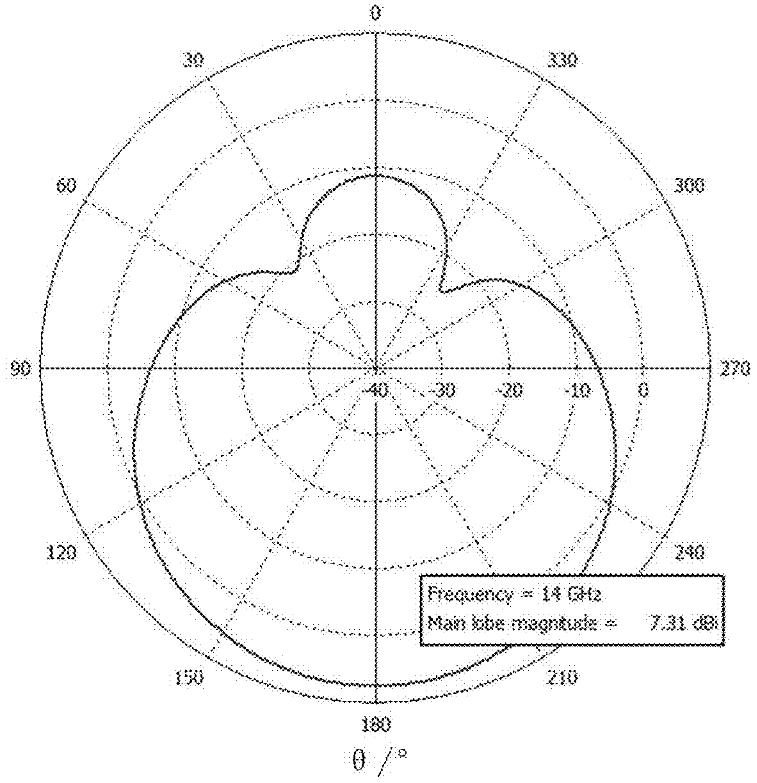
FIG. 25 is a radiation field pattern diagram when the second feed line of FIG. 15 feeds a signal and the operating frequency is 14 GHz.

Referring to FIGS. 22, 23, 24, and 25, FIG. 22 is a radiation field pattern diagram when a first feed line of FIG. 14 feeds a signal and the operating frequency is 12 GHz. FIG. 23 is a radiation field pattern diagram when a second feed line of FIG. 15 feeds a signal and the operating frequency is 12 GHz. FIG. 24 is a radiation field pattern diagram when the first feed line of FIG. 14 feeds a signal and the operating frequency is 14 GHz. FIG. 25 is a radiation field pattern diagram when the second feed line of FIG. 15 feeds a signal and the operating frequency is 14 GHz. It can be seen from FIGS. 22, 23, 24, and 25 that the radiation unit provided by this embodiment has great radiation coverage and antenna gain, and meets the antenna working requirements.

Figure 26:
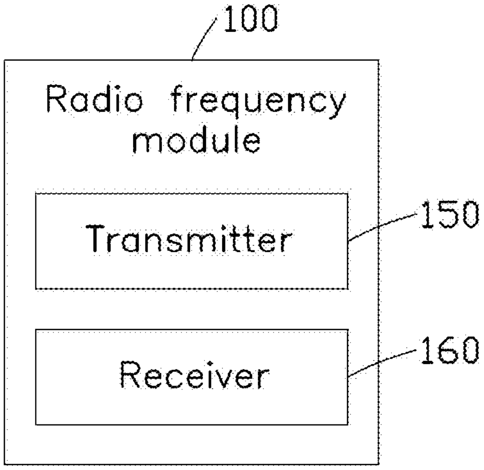
FIG. 26 is a functional block diagram of a radio frequency (RF) module according to an embodiment of the present application.

Referring to FIG. 26, one embodiment of the present application also provides a radio frequency (RF) module 100. The radio frequency module 100 includes a transmitter 150 and a receiver 160. It can be understood that the transmitter 150 and the receiver 160 form a signal transceiver electrically connected to the antenna array 10 (not shown in FIG. 26, which can be referred to the antenna array 10 described above) and for providing or receiving signals to the first feed line 1331 (1331*a*/1331*b*) and the second feed line 1351 (1351*a*/1351*b*) in the antenna array 10.

The antenna array 10 is not limited to the antenna array 10 mentioned in the embodiment I, and may also be the antenna array composed of the radiation units provided in the embodiment II or embodiment III. In this way, the radio frequency module 100, by providing the antenna array 10, provided in this application can realize communication between the device installed with the radio frequency module 100 and low-orbit satellites.

Figure 27:
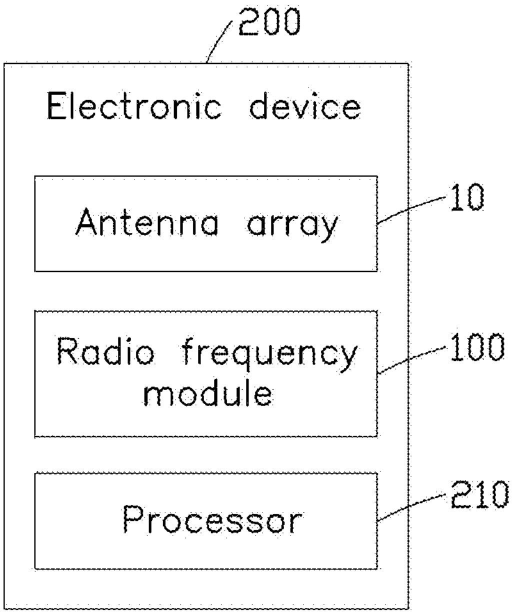
FIG. 27 is a functional block diagram of an electronic device according to an embodiment of the present application.

Referring to FIG. 27, one embodiment of the present application also provides an electronic device 200, including a processor (such as CPU) 210, the antenna array 10, and the radio frequency module 100 shown in FIG. 26. The processor 210 is used to modulate the communication signal that needs to be radiated outward and transmit it to the transmitter 150 of the radio frequency module 100, the transmitter 150 receives the modulated communication signal to generate the feed signal, and transmits the feed signal to the first feed line 1331 (1331*a*/1331*b*) and the second feed line 1351 (1351*a*/1351*b*) of the antenna array 10. The processor 210 is also used to receive the external signal received by the receiver 160 of the radio frequency module 100 through the first feed line 1331 (1331*a*/1331*b*) and the second feed line 1351 (1351*a*/1351*b*) of the antenna array 10, and demodulate the external signal. By providing the radio frequency module 100, the electronic device 200 can communicate with low-orbit satellites. The electronic device 200 may be a ground station, a mobile vehicle, or other electronic device that needs to communicate with a low-orbit satellite.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. An antenna array comprising:

at least one radiation module comprising a radiation layer and a dielectric layer arranged in stack, the radiation layer comprising a plurality of radiators, each of the plurality of radiators configured to radiate signals, the dielectric layer being made of non-conductive material;

a feed module arranged on a side of the radiation module closes to the dielectric layer, the feed module comprising a first feed layer and a second feed layer arranged in a stack, the first feed layer provided with a plurality of first feed lines, the second feed layer provided with a plurality of second feed lines, the plurality of first feed lines and the plurality of second feed lines arranged in one-to-one correspondence, forming a plurality of feed line units, the plurality of feed line units corresponding to the plurality of radiators one-to-one for providing feed signals for the corresponding radiators.

2. The antenna array of claim 1, wherein the feed module further comprises a coupling layer arranged close to the at least one radiation module, the feed module is configured to couple a current signal flowing through the plurality of feed line units to the at least one radiation module.

3. The antenna array of claim 2, wherein the coupling layer is provided with a plurality of coupling slots, the plurality of coupling slots and the plurality of feed line units are arranged in one-to-one correspondence.

4. The antenna array of claim 1, wherein the at least one radiation module comprises two radiation modules, the radiation layer of one of the two radiation modules closes to the dielectric layer of the other one of the two radiation modules, the plurality of radiators of the radiation layer of the two radiation modules are arranged in one-to-one correspondence, two corresponding radiators receive the feed signal provided by a same feed line unit.

5. The antenna array of claim 4, wherein the dielectric layer between two radiation layers is provided with a plurality of cavities, each of the plurality of cavities penetrates the dielectric layer, each of the plurality of cavities is arranged in one-to-one correspondence with the two radiators on both sides.

6. The antenna array of claim 1, wherein the first feed layer is provided with a plurality of first receiving grooves, the plurality of first receiving grooves penetrates the first feed layer, the second feed layer is provided with a plurality of second receiving grooves, the plurality of second receiving grooves penetrates the second feed layer, the plurality of first feed lines is arranged in the plurality of first receiving grooves, the plurality of second feed lines is arranged in the plurality of second receiving grooves.

7. The antenna array of claim 6, wherein an extension direction of the first feed line in the first feed layer does not completely coincide with an extension direction of the corresponding second feed line in the second feed layer.

8. The antenna array of claim 1, wherein the feed module further comprises a cavity layer and a ground layer, the cavity layer is arranged between the second feed layer and the ground layer, the cavity layer is provided with a plurality of through cavities, the plurality of through cavities is arranged in one-to-one correspondence with the plurality of feed line units.

9. The antenna array of claim 1, wherein the feed signal comprises a first feed signal and a second feed signal, the at feed module further comprises a plurality of phase couplers, the plurality of phase couplers is arranged on the first feed layer or the second feed layer, each of the plurality of phase couplers is connected to the first feed line and the second feed line correspondingly, the plurality of phase couplers is configured to output the first feed signal to the plurality of first feed lines, the plurality of phase couplers is further configured to output the second feed signal to the plurality of second feed lines.

10. The antenna array of claim 9, wherein the plurality of phase couplers is further connected to a transmitter and a receiver.

11. A ground station comprising an antenna array, the antenna array comprising:

at least one radiation module comprising a radiation layer and a dielectric layer arranged in stack, the radiation layer comprising a plurality of radiators, each of the plurality of radiators configured to radiate signals, the dielectric layer being made of non-conductive material;

a feed module arranged on a side of the radiation module closes to the dielectric layer, the feed module comprising a first feed layer and a second feed layer arranged in a stack, the first feed layer provided with a plurality of first feed lines, the second feed layer provided with a plurality of second feed lines, the plurality of first feed lines and the plurality of second feed lines arranged in one-to-one correspondence, forming a plurality of feed line units, the plurality of feed line units corresponding to the plurality of radiators one-to-one for providing feed signals for the corresponding radiators.

12. The ground station of claim 11, wherein the feed module further comprises a coupling layer arranged close to the at least one radiation module, the feed module is configured to couple a current signal flowing through the plurality of feed line units to the at least one radiation module.

13. The ground station of claim 12, wherein the coupling layer is provided with a plurality of coupling slots, the plurality of coupling slots and the plurality of feed line units are arranged in one-to-one correspondence.

14. The ground station of claim 11, wherein the at least one radiation module comprises two radiation modules, the radiation layer of one of the two radiation modules closes to the dielectric layer of the other one of the two radiation modules, the plurality of radiators of the radiation layer of the two radiation modules are arranged in one-to-one correspondence, two corresponding radiators receive the feed signal provided by a same feed line unit.

15. The ground station of claim 14, wherein the dielectric layer between two radiation layers is provided with a plurality of cavities, each of the plurality of cavities penetrates the dielectric layer, each of the plurality of cavities is arranged in one-to-one correspondence with the two radiators on both sides.

16. The ground station of claim 11, wherein the first feed layer is provided with a plurality of first receiving grooves, the plurality of first receiving grooves penetrates the first feed layer, the second feed layer is provided with a plurality of second receiving grooves, the plurality of second receiving grooves penetrates the second feed layer, the plurality of first feed lines is arranged in the plurality of first receiving grooves, the plurality of second feed lines is arranged in the plurality of second receiving grooves.

17. The ground station of claim 16, wherein an extension direction of the first feed line in the first feed layer does not completely coincide with an extension direction of the corresponding second feed line in the second feed layer.

18. The ground station of claim 11, wherein the feed module further comprises a cavity layer and a ground layer, the cavity layer is arranged between the second feed layer and the ground layer, the cavity layer is provided with a plurality of through cavities, the plurality of through cavities is arranged in one-to-one correspondence with the plurality of feed line units.

19. The ground station of claim 11, wherein the feed signal comprises a first feed signal and a second feed signal, the at feed module further comprises a plurality of phase couplers, the plurality of phase couplers is arranged on the first feed layer or the second feed layer, each of the plurality of phase couplers is connected to the first feed line and the second feed line correspondingly, the plurality of phase couplers is configured to output the first feed signal to the plurality of first feed lines, the plurality of phase couplers is further configured to output the second feed signal to the plurality of second feed lines.

20. The ground station of claim 19, wherein the plurality of phase couplers is further connected to a transmitter and a receiver.

* * * * *